United States Patent
Ranganathan et al.

(10) Patent No.: US 10,909,173 B2
(45) Date of Patent: Feb. 2, 2021

(54) SCALABLE ARCHITECTURES FOR REFERENCE SIGNATURE MATCHING AND UPDATING

(71) Applicant: The Nielsen Company (US), LLC, New York, NY (US)

(72) Inventors: Raghuram Ranganathan, Tampa, FL (US); Anand Jain, Ellicott City, MD (US); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 215 days.

(21) Appl. No.: 15/374,345

(22) Filed: Dec. 9, 2016

(65) Prior Publication Data

US 2018/0165286 A1    Jun. 14, 2018

(51) Int. Cl.
| | |
|---|---|
| *G06F 16/683* | (2019.01) |
| *G06F 16/783* | (2019.01) |
| *G06F 16/11* | (2019.01) |
| *G06F 16/245* | (2019.01) |
| *G06F 16/632* | (2019.01) |

(52) U.S. Cl.
CPC .......... *G06F 16/683* (2019.01); *G06F 16/783* (2019.01); *G06F 16/122* (2019.01); *G06F 16/125* (2019.01); *G06F 16/245* (2019.01); *G06F 16/634* (2019.01)

(58) Field of Classification Search
CPC ......... H04N 21/8358; H04N 21/23892; H04N 21/8352; H04N 21/2541; H04N 21/44008; G06F 17/30026; G06F 17/30038; G06F 17/30758; G06F 17/30784; G06F 17/30864; G06F 17/30011; G06F 17/30014; G06F 17/3002; G06F 17/30035; G06F 17/30082; G06F 16/783; G06F 16/634; G06F 16/683; G06F 16/951; G06F 16/122; G06F 16/137; G06F 16/2358
USPC ................ 707/770, 736, 746, 747, 749, 769
See application file for complete search history.

(56) References Cited

U.S. PATENT DOCUMENTS

| | | |
|---|---|---|
| 5,870,754 A | 2/1999 | Dimitrova et al. |
| 6,463,433 B1 | 10/2002 | Baclawski |
| 8,411,977 B1 | 4/2013 | Baluja et al. |
| 9,202,255 B2 * | 12/2015 | Bauer ...................... G06F 16/43 |
| 9,367,669 B2 * | 6/2016 | Gratton ..................... H04L 9/32 |

(Continued)

*Primary Examiner* — Dangelino N Gortayo
(74) *Attorney, Agent, or Firm* — Hanley, Flight & Zimmerman, LLC

(57) ABSTRACT

Methods, apparatus, systems and articles of manufacture are disclosed for scalable architectures for reference signature matching and updating. An example method for scalable architectures for reference signature matching and updating includes accessing site signatures to be compared to reference signatures from a first group of media sources. Determining if a first reference node is an owner of a first one of the site signatures. Comparing a neighborhood of site signatures including the first site signature to reference signatures in a first subset of reference signatures when the first reference node is the owner of the first site signature, the first subset of references signatures stored in a first memory partition associated with the first reference node. Not comparing site signature to reference signatures when the first reference node is not the owner of the first one of the site signatures.

20 Claims, 11 Drawing Sheets

(56) References Cited

U.S. PATENT DOCUMENTS

| | | | |
|---|---|---|---|
| 9,773,098 B1* | 9/2017 | Waid | G11B 20/00086 |
| 2008/0109369 A1* | 5/2008 | Su | G06Q 10/06 |
| | | | 705/59 |
| 2008/0209502 A1* | 8/2008 | Seidel | G06F 17/30038 |
| | | | 726/1 |
| 2009/0013414 A1* | 1/2009 | Washington | G06F 21/10 |
| | | | 726/32 |
| 2009/0144325 A1* | 6/2009 | Chastagnol | G06Q 30/06 |
| 2009/0164427 A1* | 6/2009 | Shields | G06F 17/30613 |
| 2010/0262488 A1* | 10/2010 | Harrison | G06Q 30/02 |
| | | | 705/14.46 |
| 2010/0318587 A1* | 12/2010 | Seet | G06F 16/41 |
| | | | 707/791 |
| 2011/0022638 A1* | 1/2011 | Jiang | G06F 16/683 |
| | | | 707/797 |
| 2011/0029549 A1* | 2/2011 | Pandya | G11C 15/00 |
| | | | 707/758 |
| 2012/0167133 A1* | 6/2012 | Carroll | G06Q 30/0251 |
| | | | 725/32 |
| 2012/0278828 A1* | 11/2012 | Yazdani | H04N 21/44222 |
| | | | 725/19 |
| 2013/0198792 A1* | 8/2013 | Wright | H04N 21/23 |
| | | | 725/116 |
| 2013/0246334 A1* | 9/2013 | Ahuja | G06F 16/93 |
| | | | 707/600 |
| 2013/0326573 A1* | 12/2013 | Sharon | H04H 60/59 |
| | | | 725/115 |
| 2014/0358938 A1* | 12/2014 | Billmaier | H04L 67/10 |
| | | | 707/747 |
| 2015/0039538 A1 | 2/2015 | Hefeeda et al. | |
| 2015/0074833 A1* | 3/2015 | Brock | G06F 17/30864 |
| | | | 726/32 |
| 2016/0366474 A1* | 12/2016 | Chen | G06F 16/2246 |
| 2017/0116694 A1* | 4/2017 | Gabie | G06Q 50/188 |
| 2017/0118538 A1* | 4/2017 | Ashbacher | G06F 16/783 |
| 2017/0155933 A1* | 6/2017 | Del Strother | H04N 21/8358 |

* cited by examiner

SCALABLE ARCHITECTURES FOR REFERENCE SIGNATURE MATCHING AND UPDATING

FIELD OF THE DISCLOSURE

This disclosure relates generally to media monitoring, and, more particularly, to scalable architectures for reference signature matching and updating.

BACKGROUND

A media monitoring and matching system typically includes one or more device meters to monitor the media presented by one or more media presentation devices located at one or more monitored sites. Such a device meter can use watermarks decoded from the presented media and/or signatures (also referred to as media fingerprints or just fingerprints) generated from the presented media, or both, to monitor (e.g., identify and/or track) the media being presented by a media presentation device. For example, identification codes, such as watermarks, ancillary codes, etc., may be transmitted within media signals. Identification codes are data that are transmitted with media (e.g., inserted into the audio, video, or metadata stream of media) to uniquely identify broadcasters and/or the media (e.g., content or advertisements), and/or are associated with the media for another purpose, such as tuning (e.g., packet identifier headers ("PIDs") used for digital broadcasting). Codes are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of identification codes in the media but, instead, preferably reflect one or more inherent characteristics of the media and/or the signal transporting the media. Systems to utilize codes and/or signatures for audience measurement are long known. See, for example, Thomas, U.S. Pat. No. 5,481,294, which is hereby incorporated by reference in its entirety.

When signatures are used for media monitoring, signatures of the monitored media (referred to herein as site signatures) are generated by the device meter and compared to reference signatures representative of reference media known to the media monitoring system. When a match is found, the media corresponding to the site signature being processed can be identified as corresponding to the reference media represented by the matching reference signature(s). In many media monitoring and matching systems, the device meters provide their generated site signatures to a data processing facility or other centralized processing site for comparison with the reference signatures that are representative of the reference media available for presentation at the respective monitored sites. Such comparison may involve comparing large numbers of site signatures with large numbers of reference signatures, especially when the number of monitored sites is large and/or the amount of possible reference media available for consumption is large.

DETAILED DESCRIPTION

Example methods, systems, and/or articles of manufacture (e.g., physical storage media, structures, etc.) to implement scalable architectures for reference signature matching and updating are disclosed herein. Some examples disclosed herein enable scalable real-time reference signature updating and matching for media identification and monitoring using a database executing on an expandable cluster of nodes in one or more computer systems. The example scalable architecture for reference signature matching and updating can be scaled in response to changes in a number of different dimensions. For example, some disclosed example systems can be scaled in response to changes in the number of client devices (e.g. device meters) sending queries and/or metering data for media (e.g., content and/or advertisements) to be identified and/or monitored (e.g. a client dimension). Advantageously or alternately, some disclosed example systems can be scaled in response to a change in the number of different items/media that can be identified (e.g. a content dimension). Advantageously or alternately, some disclosed example systems can be scaled in response to a change in a required response time to a query (e.g. a time dimension) and the system can be scaled for a combination of the above dimensions.

The ability to scale the system in response to changes in the different dimensions enables the system to reduce a query response time, increase the number of different pieces of media that can be identified in the database (e.g. the number of reference signatures stored in the system), shorten the time between when the media is presented and when it can be identified, etc., or any combination of the above.

In some examples, the media information to be identified and/or monitored includes audio information, video information or a combination of audio and video information. The media information may be in the form of codes, signatures and/or any other type of information that identifies the media. In the following examples, for simplicity, system operation is described from the perspective of signatures (e.g. site signatures) being generated and compared to reference signatures. However, the following examples are not limited to using signatures, but could use codes and/or any other type of information that can identify media.

In some examples, the scalability of the system is enabled by using a nested distributed map for storing a reverse index. The nested distributed map allows media identification (e.g. signatures, codes, etc.) lookup and matching workload to be distributed among some or all the nodes in a cluster and/or across multiple clusters, as described in further detail below.

Figure 1:
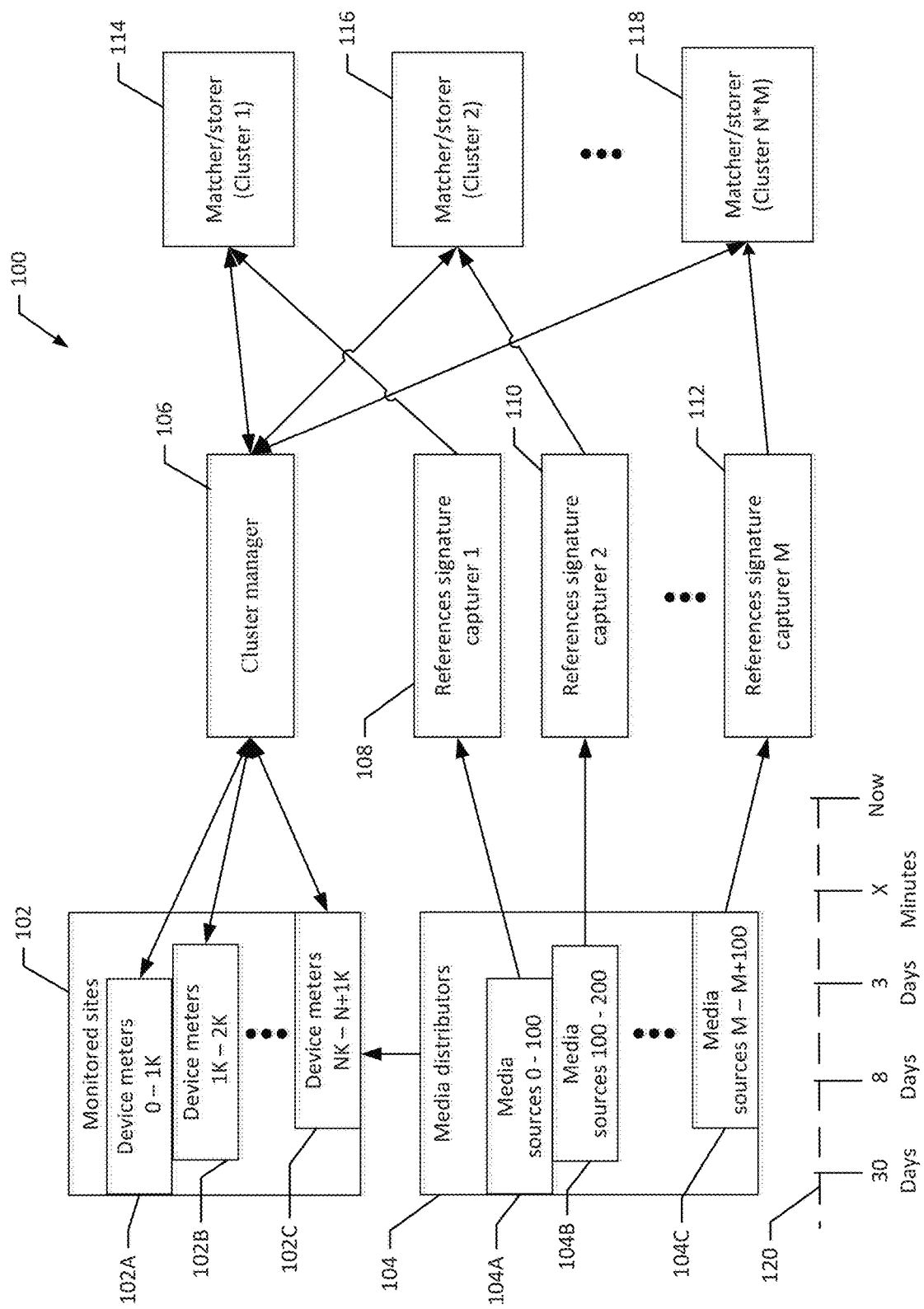
FIG. 1 is a block diagram of an example system 100 for implementing an example scalable architecture for reference signature matching and updating.

FIG. 1 is a block diagram of an example system 100 for implementing an example scalable architecture for signature matching and updating. In this example, the system 100 is used to match signatures from device meters monitoring media (e.g. site signatures) to reference signatures representative of a collection of reference media. The example system 100 includes a plurality of example monitored sites 102, a plurality of example device meters 102A-C located at the monitored sites, a plurality of example media distributers 104 using a plurality of example media (e.g., content and/or advertisement) sources 104A-C (e.g., such as one or more radio frequency, cable and/or satellite television and/or radio channels or stations, one or more networks carrying one or more digital transport channels, etc.) to distribute the media to the monitored sites, an example cluster manager 106, a first example reference signature capturer 108, a second example reference signature capturer 110, etc., up to an $M^{th}$ example reference signature capturer 112, a first example matcher/storer 114, a second example matcher/storer 116, etc., up to an $M*N^{th}$ example matcher/storer 118.

The example monitored sites 102 of FIG. 1 include a plurality of example device meters 102A-C, also referred to as a meter, a site meter, a site unit, a home unit, a media meter, etc., to monitor media presented by a media presentation device. In the illustrated example, the media monitored by the device meters can correspond to any type of media presentable by the media presentation device. For example, monitored media can be media content, such a television programs, radio programs, movies, etc., and/or commercials, advertisements, etc. In the illustrated example, the device meters determine metering data that may identify and/or be used to identify media exposure (and, thus, infer media consumption) at the monitored sites 102. The metering data determined by the example device meters includes one or more site signature(s) representative of the media presented by the media device. The metering data may include other information/metadata in addition to the site signature(s), for example a time stamp, a device meter location, people identification information, etc.

The example system of FIG. 1 includes a plurality of media distributors 104. A media distributor can correspond to any type of media distributor, such as a television station, a cable network, a satellite network (e.g., television or radio), a radio station, a streaming media service (e.g., such as Hulu™, Netflix®, etc.), etc. As such, the media distributed by the media distributor(s) can correspond to any type of media, such as television programming, radio programming, multimedia (e.g., audio and/or visual) data, etc. In the illustrated example, the media distributor(s) can distribute a particular piece of media (e.g., such as a particular television program, a particular radio program, a particular movie, etc.) to recipients (e.g., television viewers, radio listeners, computer users, electronic device users, etc.) via one or more of a plurality of example media sources 104A-C (e.g., such as one or more radio frequency, cable and/or satellite television and/or radio channels or stations, one or more networks carrying one or more digital transport channels, etc.).

The media distributor(s) distribute media to the plurality of example monitored sites that, in some examples, correspond to one or more panelists selected (e.g., statistically) for inclusion in an audience measurement panel, media monitoring survey, etc. Each monitored site 102 includes one or more media presentation device(s) to present the media received at the monitored site 102. The device meters 102A-C monitoring the presented media send queries and/or metering data to the matcher/storer(s) 114, 116 and 118 via the cluster manager 106, to determine if the site signatures included in the queries and/or metering data match reference signatures located in the matcher/storer(s) 114, 116 and 118. In some examples, when a match is found, the matcher/storer(s) 114, 116 and 118 send the matching information to the cluster manager 106 and the cluster manager 106 credits the media presentation device as presenting the media represented by the reference signatures that matches the site signatures. In other examples, the matcher/storer(s) 114, 116 and 118 may also reply to the queries from the device meters, via the cluster manager 106, indicating the identity of the media when a match is found.

The cluster manager 106 receives the queries/metering data from the device meters 102A-C and sends the queries/metering data to each matcher/storer 114, 116 and 118, as described in more detail below. In some examples, the cluster manager 106 receives the identity of the media from the matcher/storer 114, 116 and 118 and sends the identity of the media to the appropriate device meter 102A-C in response to a particular query, as described in more detail below.

In the illustrated example, the reference signatures are captured from the media distributers by the reference signature capturers 108, 110 and 112. The reference signature capturers 108, 110 and 112 generate some or all of the reference signatures used by the matcher/storer 114, 116 and 118. The reference signature capturers 108, 110 and 112 capture the references signatures from the plurality of media sources 104A-C used by the plurality of media distributors 104 to distribute the media to the monitored sites 102. As described in further detail below, in some examples, the reference signature capturers 108, 110 and 112 are located separately from the monitored site(s) 120 and monitor media distributions by some or all of the media distributor(s) 104. The reference signature capturers 108, 110 and 112 determine reference signatures from the media distributions, which correspond to the possible media that could be received by the monitored site(s) 102. For example, for each media distribution monitored by a given one of the reference signature capturers 108, 110 and 112, that reference signature capturer 108, 110 and 112 generates respective reference signatures (e.g., blocks of reference signatures associated with a signature monitoring interval), timestamps the reference signatures with time information (e.g., such as day and/or time-of-day information) corresponding to when the monitored media was received at that reference signature capturers 108, 110 and 112, and associates media identification information with the reference signatures. The reference signature capturers 108, 110 and 112 then store and report the timestamped reference signatures and media identification information to their respective matcher/storer(s) 114, 116 and 118. The captured references signatures are stored in the matcher/storer(s) 114, 116 and 118 for comparison to the site signatures provided by the device meters in the metering data.

In the system 100 of the illustrated example, the example matcher/storer(s) 114, 116 and 118 perform signature retrieval and matching for media monitoring as disclosed herein. Unlike media monitoring techniques based on codes and/or watermarks included with and/or embedded in the monitored media, signature-based media monitoring techniques generally use one or more inherent characteristics of the monitored media during a signature sampling interval to generate a substantially unique proxy for the media. Such a proxy is referred to as a signature or media fingerprint, and can take the form of a series of bits, data values, a waveform, etc., representative of the media signal(s) (e.g., an audio signal and/or a video signal) forming the media presentation being monitored. A good signature is usually one that is repeatable when processing the same media presentation, but that is unique relative to other (different) presentations of other (different) media. Thus, as used herein, a signature is a representation of some characteristic of the media signal (e.g., a characteristic of the frequency spectrum of the signal) which can be used to identify the signal, and can be thought of as a fingerprint. Signatures are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

The example system 100 of FIG. 1 can be scaled in response to changes in a number of different dimensions. For example, the system 100 can be scaled in response to: (1) a change (e.g. increases or decreases) in the number of client devices (e.g. device meters 102A-C) sending in queries and/or content information (e.g. metering data) to be identified (e.g. a client dimension), (2) a change (e.g. increases or decreases) in the number of different items/media that can be identified (e.g. a content dimension), (3) a change in a required response time to a query (e.g. a time dimension) (4) a combination of the above dimensions. The changes can be made in "real time" to compensate for variations in demand during different parts of a day. For example, the system 100 may scale up during a high demand period corresponding to when a popular show is being broadcast, and scale down during the middle of the night when many people are asleep.

In some examples, the system 100 of FIG. 1 has a minimum or static capacity. The minimum or static capacity is provided for by the cluster manager 106 and the first matcher/storer 114 that may operate on permanent servers or a permanent cluster of nodes in a computer system.

In some examples, the minimum or static capacity is provided when the number of device meters and media sources 104A-C are low such that a minimum response time to a query can be met with the system 100 operating in its minimum state. For example, when the number of device meters 102A-C are within a first range of numbers, for example between 0 and 1000 device meters 102A-C, and the number of media sources 104A-C are within a first range of numbers, for example between 0-100 media sources 104A-C, the system 100 of FIG. 1 may only have the cluster manager 106 and the first matcher/storer 114 operating. In other examples, the minimum or static capacity may handle more or fewer than 1000 device meters 102A-C and may handle more or fewer than 100 media sources 104A-C.

In some examples, as the number of device meters 102A-C increase beyond the first range of device meters 102A-C, for example increasing to between 1K and 2K number of device meters 102A-C, the example system 100 of FIG. 1 may expand/add a second matcher/storer 116 operating on a second cluster of nodes in a computer system. The second cluster of nodes may be included in the same computer system as the first cluster of nodes, or may be in a second computer system. In this way, the example system 100 of FIG. 1 can be scaled upward to handle the increased number of device meters 102A-C. When the number of device meters 102A-C continues to increase, for example up to NK device meters 102A-C, the number of matcher/storers can be increased to N number of matcher/storer 118 operating on N number of clusters in one or more computer systems. When the number of device meters 102A-C decline to within the first range of device meters 102A-C, the number of operating matcher/storers 114, 116 and 118 can be reduced to the minimum or static number of matcher/storers 114, 116 and 118 (e.g. only the first matcher/storer 114 operating on the permanent servers or a first cluster of nodes in a computer system).

In some examples, the cluster manager 106 monitors the number of different device meters 102A-C sending in queries. In other examples, a separate capacity manager may monitor the number of different device meters 102A-C sending in queries. When the number of device meters 102A-C exceeds the current upper client dimension threshold, a new cluster may be initiated/launched. In some examples, when the number of device meters 102A-C exceeds the current upper client dimension threshold, additional reference nodes may be added to an existing cluster (e.g. an existing matcher/storer), as described in more detail below with reference to FIG. 11. The example cluster manager 106 then resets the upper and lower client dimension thresholds to the next highest level. For example, when the system 100 of FIG. 1 is operating with only the static capacity and the number of devices exceeds 1,000 device meters 102A-C sending in queries, the cluster manager 106 initiates the launching of the second matcher/storer 116 (e.g. cluster 2) and resets the upper client dimension threshold to 2,000 device meters 102A-C and resets the lower client dimension threshold to 1,000 device meters 102A-C. In some examples, when the number of devices falls below a lower client dimension threshold, a cluster will be deactivated and the cluster manager 106 will reduce the upper and lower client dimension thresholds to the next lowest level.

In some examples, the cluster manager 106 determines the number of device meters 102A-C sending in queries by counting the number of different device meters 102A-C sending in queries over a given time period. In other examples, the cluster manager 106 may use the current utilization of the servers and/or the CPU utilization on one or more clusters to estimate the number of device meters 102A-C sending in queries. In other examples, the cluster manager 106 may monitor the number of pending queries to determine the number of device meters 102A-C sending in queries.

In some examples, the cloud provider upon which the system 100 of FIG. 1 is operating, may provide services to monitor the load on the system 100. For example, Amazon®/Azure® provide a service called elastic load balancing and auto scaling. This service can be used by defining certain parameters for CPU utilization, connection count, and the like, that when exceeded, cause a new cluster to be launched. The cluster can be launched based on pre-backed images (Amazon Machine Image) that includes the entire OS and stack. In some example, the auto scaling feature may be used to scale the system 100 of FIG. 1 up or down in response to changes in the client dimension, the content dimension, the time dimension, or a combination of these dimensions.

The example system 100 of FIG. 1 can be scaled in the content dimension. In some examples, as the number of media sources 104A-C increase beyond a first range of media sources 104A, (e.g. increase beyond 100 media sources), the example system 100 of FIG. 1 can be scaled upward to handle the increased number of media sources by increasing the number of operating matcher/storer 114, 116 and 118. When the number of media sources continues to increase, for example up to M media sources 104C, the number of matcher/storers can be increased to M number of matcher/storers 118.

In the illustrated example of FIG. 1, the number of media sources may be increased or decreased by a system administrator. The number of media sources 104A-C may be increased or decreased by adding or removing one or more media providers along with its corresponding reference signature capturer 108, 110 and 112, adding or removing a station or channel of one of the currently selected media providers, or the like.

In some examples, when the number of device meters 102A-C increase to N device meters 102A-C and the number of media sources 104A-C increases to M media sources, the total number of operating matcher/storer may be increased to M*N number of matcher/storers 118. In this way, the example system 100 of FIG. 1 can be scaled in multiple dimensions simultaneously.

In some examples, the system 100 of FIG. 1 can also be scaled in the time dimension 120. For example, the example system 100 of FIG. 1 can be adjusted/scaled in response to a change in the target response time to a query. The response time to a query is the time between receiving a query and determining if the site signature in the query matches a reference signature. In addition, the example system 100 of FIG. 1 can be adjusted/scaled in response to a change in media availability time. Media availability time is the time it takes between when media is presented to a reference signature capturer 108, 110, and 112 and when a reference signature is available for comparison.

The scaling in the time dimension can occur when a change in the target response time to a query is detected, in response to a change in media availability time, and/or a combination of the two. The time dimension scaling is implemented by scaling the number of matcher/storers 114, 116 and 118 that are operating. In some examples, the cluster manager 106 monitors the response time to a query and scales the system 100 up or down due to changes in the response time. In other examples, a separate capacity manager may monitor the response time to a query and scale the system 100 in response to changes in the response time. In yet other examples, the auto scaling feature of the service provider may be used to scale the system 100 in response to changes in the response time.

In some examples, the cluster manager 106 monitors the media availability time and scales the system 100 up or down due to changes in the media availability time. In some examples, the cluster manager 106 monitors the media availability time by checking with the currently operating matcher/storers 114, 116 and 118 for the current media availability time. In some examples, the matcher/storer 114, 116 and 118 determine the media availability time by comparing the time stamp of a reference signature to the time when the reference signature is available for matching in a reference node (as describe in more detail below). In other examples, the elastic load balancing and auto scaling features provided by the cloud service may be used to scale the system 100 in the time dimension.

Figure 2:
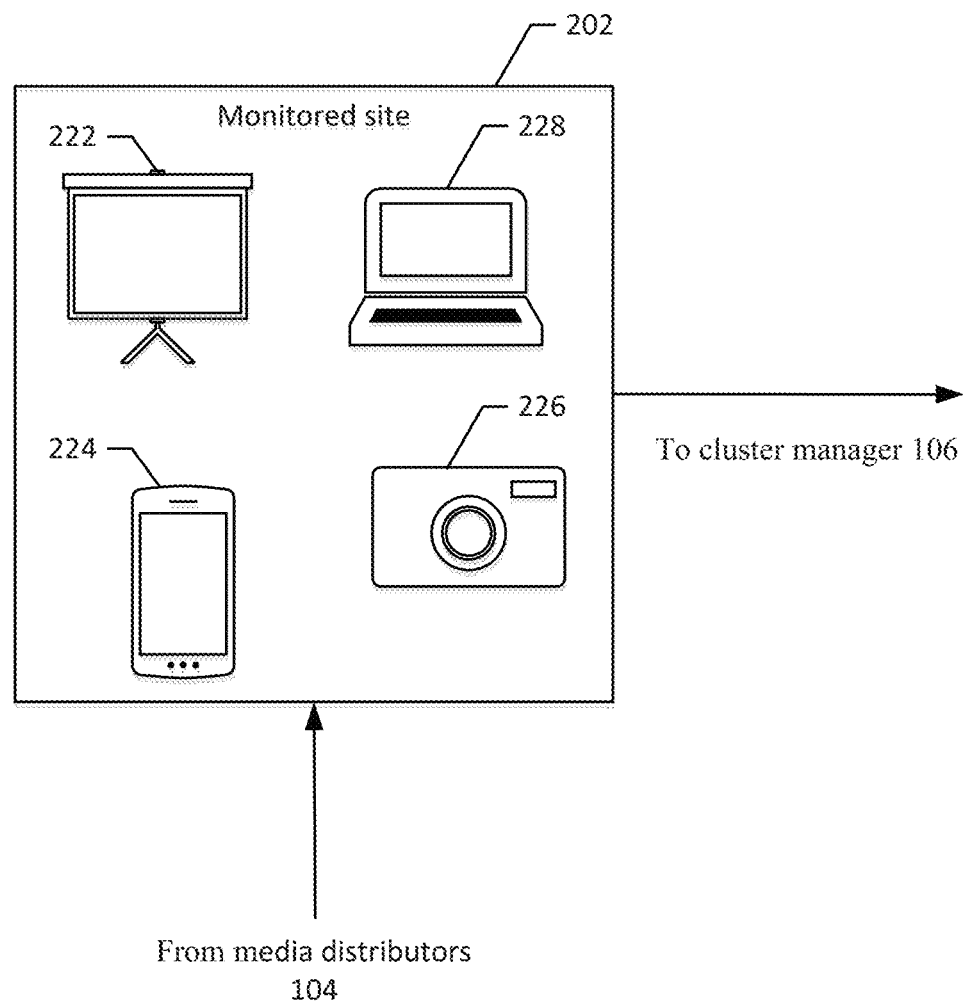
FIG. 2 is a block diagram of an example monitored site included in the example system of FIG. 1.

FIG. 2 is a block diagram of an example monitored site 202, which corresponds to one or more of the plurality of example monitoring sites 102 of FIG. 1. The example monitored site 102 of FIG. 2 includes one or more media presentation devices, for example a television 222, and one or more device meters 102A-C, for example the smart phone 224, the digital camera 226 and/or the laptop computer 228. In the example monitored site 202 of FIG. 2, the device meters 224, 226 and 228, which correspond to example device meters 192A-C of FIG. 1, may utilize invasive monitoring involving one or more physical connections to the media presentation device, and/or non-invasive monitoring not involving any physical connection to the media presentation device, to obtain access to one or more media signals corresponding to the media being presented by the media presentation device. In some examples, the device meters 224, 226 and 228 may process audio signals obtained from the media presentation device via a microphone and/or other audio sensor(s), and/or via a direct cable connection, to generate audio site signatures representative of the media being presented by the media presentation device 222. Additionally, or alternatively, the device meters 224, 226 and 228 may process video signals obtained from the media presentation device 222 via a camera and/or other video sensor(s), and/or a direct cable connection, to generate video site signatures (e.g., image signatures) representative of the media being presented by the media presentation device 222. The site signatures generated by the device meters 224, 226 and 228 at respective generation intervals can then be compared (e.g., at the matcher/storer(s)) with known reference signatures to identify/monitor the media being presented by the media presentation device 222.

In some examples, the device meters 224, 226 and 228 of FIG. 2 determine (e.g., generate) site signature(s) (also referred to as collected signature(s)) representative of a media signal (e.g., an audio signal and/or a video signal) output by a monitored media presentation device 222 at a monitored site 202. The device meters 224, 226 and 228 at the monitoring site 202 includes the site signature(s) in the queries and/or the metering data reported to the example matcher/storer(s) 114, 116 and 118 via the cluster manager 106. The matcher/storer(s) 114, 116 and 118 then compare the site signature(s) to one or more references signatures corresponding to known (e.g., reference) media. Various comparison criteria, such as a cross-correlation value, a Hamming distance, population (POP) count, etc., can be evaluated to determine whether a site signature (or block of site signatures) matches a particular reference signature (or block of reference signatures). When a match between the site signature(s) and one of (or a block of) the reference signatures is found, the matcher/storer(s) 114, 116 and 118 send the matching information to the cluster manager 106. The cluster manager 106 identifies the monitored media represented by the site signature(s) as corresponding to the particular reference media represented by the reference signature(s) that matched the site signature(s). Because attributes, such as an identifier of the media, a presentation time, a broadcast channel, etc., are collected and, thus, known for the reference media represented by the matching reference signature(s), the cluster manager 106 may associate the monitored media with these same attributes of the matching reference media. The cluster manager 106 can then use the identified attributes of the monitored media to perform any appropriate post-processing to, for example, determine audience ratings information, identify targeted advertising to be provided to the monitored site 202, respond to queries from the device meters 224, 226 and 228 with an identity of the media, etc.

The device meters 224, 226 and 228 of the illustrated example store the queries and/or the metering data, including the generated site signatures, for reporting to the matcher/storer(s) 114, 116 and 118 via the cluster manager 106. The generated site signatures in the queries and/or the metering data are also timestamped to allow the site signatures to be associated with the particular time when the site signatures were generated. The timestamps also indicate the time at which the monitored media represented by the site signatures was presented at the monitored site 202. The device meters 224, 226 and 228 can report the metering data (including the site signatures and timestamps) as it is collected (e.g., streamed), at specified/predetermined time intervals, when a certain amount of data has been collected, when an available memory space is filled or reaches a threshold capacity (e.g., 90% or some other percentage being full), and/or via any other periodic, aperiodic and/or event-driven schedule. In addition, the device meters 224, 226 and 228 may query the matcher/storer(s) 114, 116 and 118 via the cluster manager 106 to determine the identity of media being presented at the monitored site as the media is being presented.

Figure 3:
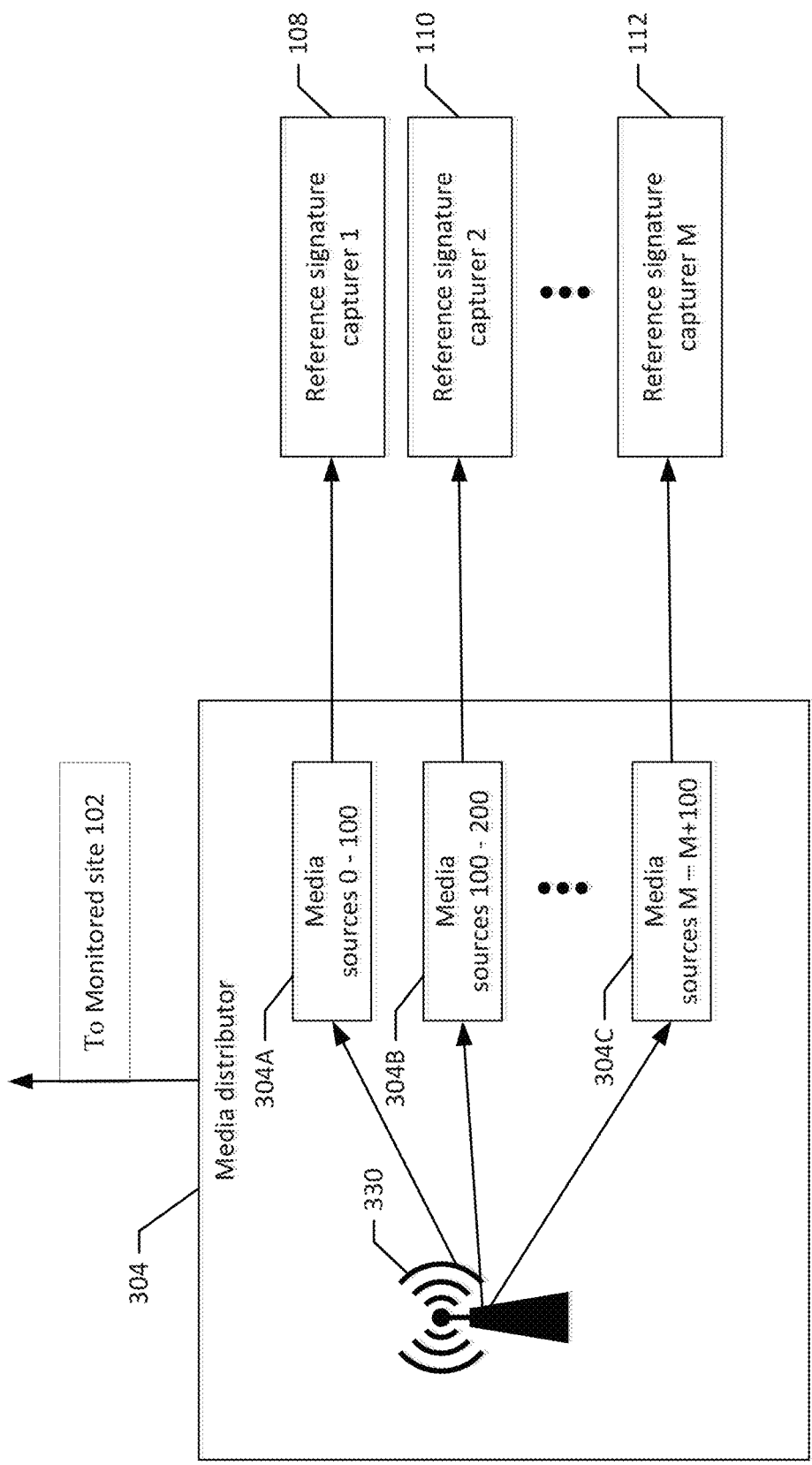
FIG. 3 is a block diagram of an example media distributor included in the example system of FIG. 1.

FIG. 3 is a block diagram of an example media distributor 304, which corresponds to one or more of the plurality of media distributors 104 of FIG. 1. The media distributor 304 includes one of more media distribution devices 330. The media distribution device 330 can correspond to any type of media distribution devices, such as a television station, a cable network, a satellite network (e.g., television or radio), a radio station, a streaming media service (e.g., such as Hulu™, Netflix®, etc.), etc. As such, the media distributed by the media distribution device 330 can correspond to any type of media, such as television programming, radio programming, multimedia (e.g., audio and/or visual) data, etc. In the illustrated example, the media distribution device 330 can distribute a particular piece of media via one or more of a plurality of example media sources 104A-C (e.g., such as one or more radio frequency, cable and/or satellite television and/or radio channels or stations, one or more networks carrying one or more digital transport channels, etc.).

As describe in more detail below, a first reference signature capturer 108 monitors the media distributed by the media distribution device 330 through a first plurality of media sources, for example media sources 304A (e.g. channels/stations 0-100). When the media distributor 304 is distributing media using more than the first plurality of media sources, for example media sources 304B (e.g. channels/stations 100-200), a second reference signature capturer 110 monitors the second plurality of media sources. When the media distributor 304 is distributing media using M number of media sources, for example, media sources 304C (e.g. channels/stations M–M+100), the $M^{th}$ reference signature capturer 112 would monitor the $M^{th}$ plurality of media sources. In the illustrated example, each reference signature capturer 108, 110, and 112 is shown monitoring 100 media sources. In other examples, each reference signature capturer 108, 110, and 112 may monitor more or fewer media sources. In the illustrated example, each reference signature capturer 108, 110, and 112 is shown monitoring the same number of media sources (e.g. 100). In other examples, the different reference signature capturers 108, 110, and 112 may monitor a different number of media sources. For example, the first reference signature capturer 108 may monitor 75 media sources and the second reference signature capturer 110 may monitor 125 media sources.

Figure 4:
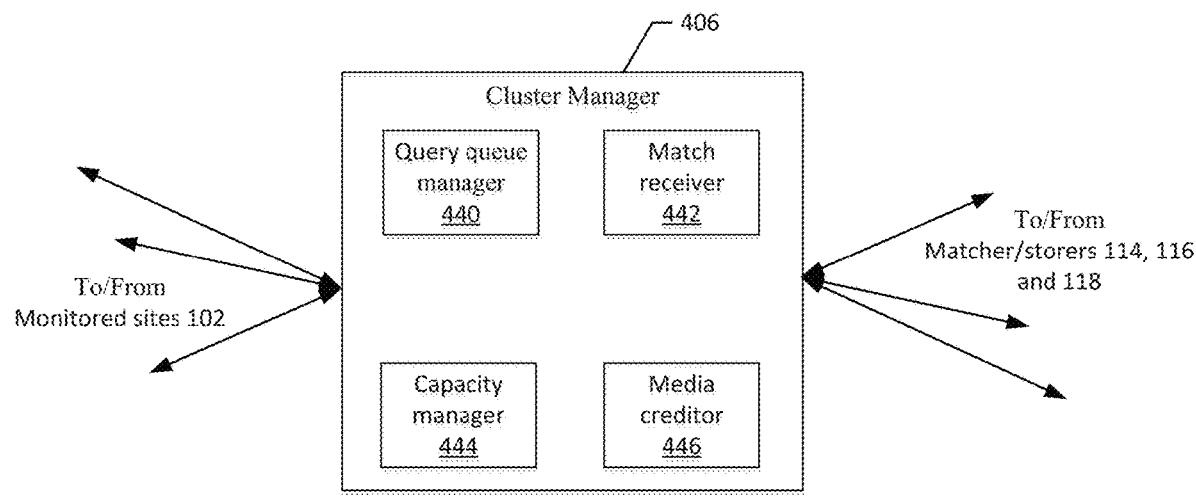
FIG. 4 is a block diagram of an example cluster manager included in the example system of FIG. 1.

FIG. 4 is a block diagram of an example cluster manager 406, which corresponds to the example cluster manager 106 from FIG. 1. The example cluster manager 406 receives metering data and/or queries from the device meters 102A-C. The example cluster manager 406 includes an example query queue manager 440, an example match receiver 442, an example capacity manager 444 and an example media creditor 446. The example query queue manager 440 queues the metering data and/or the queries and dispatches them to each of the currently operating matcher/storer(s) 114, 116 and 118. In some examples, the query queue manager 440 spawns multiple threads, where each thread sends an instance of the same query to each operating matcher/storer 114, 116 and 118 (e.g. each cluster). In this way, each matcher/storer can be the same query in parallel.

The example match receiver 442 receives the responses to the queries (e.g. the reference signature matching information) from the matcher/storer(s) 114, 116 and 118 and sends the response to the query queue manager 440. The query queue manager 440 sends the response to the device meter 102A-C that sent the query. In some example, a response to the query is only sent when a match to the query occurred. In other examples, a response to the query is sent regardless of whether a match to the query occurred.

In the illustrated example of FIG. 4, the example capacity manager 444 monitors the number of device meters 102A-C sending queries. The example capacity manager 444 scales the system 100 upward when the number of device meters 102A-C exceeds an upper client dimension threshold and scales the system 100 down when the number of device meters 102A-C falls below a lower client dimension threshold. In some examples, the example capacity manager 444 may use an average number of device meters 102A-C over a given time period to compare to the client dimension thresholds.

In the illustrated example of FIG. 4, the example capacity manager 444 monitors the response time to queries from the device meters 102A-C. The example capacity manager 444 scales the system 100 upward when the response time exceeds an upper time dimension threshold and scales the system 100 down when the response time falls below a lower time dimension threshold. In some examples, the example capacity manager 444 may use an average response time over a given time period to compare to the time dimension thresholds.

In some examples, the capacity manager 444 may be separate from the cluster manager 406. In some examples, the elastic load balancing and auto scaling features provided by the cloud service may be used to scale the system 100 in the different dimensions.

The example media creditor 446 receives the reference signature matching information from the match receiver 442 and credits the media presentation device as presenting the media with the reference signature that matches the site signature.

Figure 5:
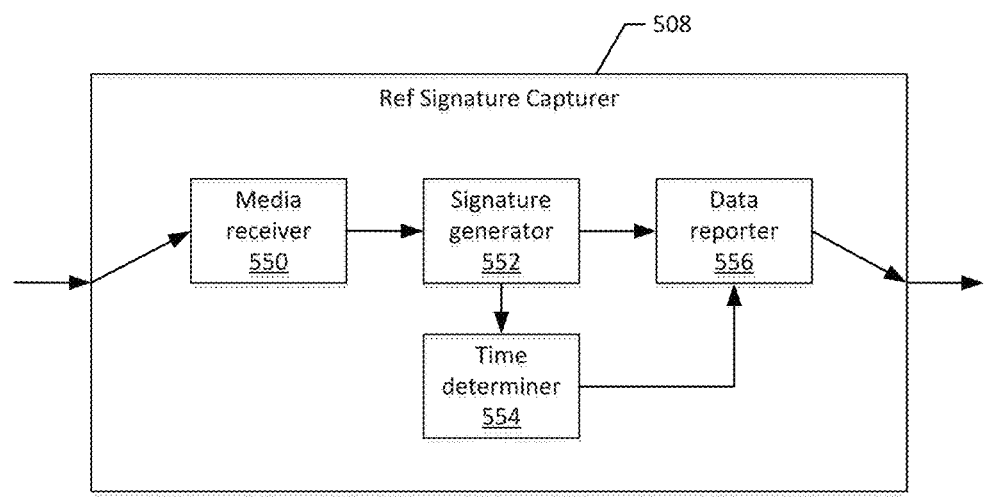
FIG. 5 is a block diagram of an example reference signature capturer included in the example system of FIG. 1.

FIG. 5 is a block diagram of an example reference signature capturer 508, which corresponds to the first reference signature capturer 108 of FIG. 1. In the illustrated example of FIG. 5, the reference signature capturer 508 includes one or more example media receiver(s) 550 to receive media being distributed by the media distributor(s) 104. For example, the media receiver(s) 550 can include multiple receivers assigned to respective media distributors 104 or to respective media sources 104A-C, such as particular television channels/networks, particular radio channels/networks, particular streaming services, etc. Additionally or alternatively, one or more of the media receiver(s) 550 can be shared (e.g., time-multiplexed) among multiple media distributors 104 or multiple media sources 104A-C.

The example reference signature capturer 508 of FIG. 5 also includes one or more example signature generators 552 to generate reference signatures representative of the media received by the media receiver(s) 550. For example, the signature generator(s) 552 can include audio signature generator(s) to generate audio signatures representative of the audio signal(s) corresponding to audio portion(s) of the media received by the media receiver(s) 550. Additionally or alternatively, the signature generator(s) 552 can include video signature generator(s) to generate video (e.g., image) signatures representative of the video signal(s) corresponding to video portion(s) of the media received by the media receiver(s) 550. As such, in some examples, the signature generator(s) 552 may implement signature generation technique(s) similar to those implemented by the device meter(s) 102A-C at the monitored sites(s) 102.

The signatures generated by the signature generator(s) 552 are reference signatures that can be used (e.g., by the matcher/storer(s) 114, 116 and 118) to identify corresponding media being distributed by the media distributor(s) 104. For example, for each media distribution received and processed by the reference signature capturer 508, the reference signatures output from the signature generator(s) are associated with media identification data (e.g., such as a source identifier, a stream identifier, a channel or station, etc., as described in further detail) identifying the particular media represented by the reference signatures. Such media identification data can be known to the reference signature capturer 508 based on, for example, the known association of the media receiver(s) 550 to the respective media distributor(s) 102 or to the respective media sources 104A-C.

The example reference signature capturer 508 of FIG. 5 further includes one or more example time determiner(s) 554 to determine time information for association with the reference signatures determined by the signature generator (s) 552. For example, a signature generator 552 can trigger a time determiner 554 to determine time information (e.g., timestamps) indicating when reference signatures for a particular piece of media were generated and, thus, when the corresponding reference media was received by the respective media receiver 550. The time information can include, for example, the particular day and/or time-of-day at which a particular block of reference signatures was generated, which corresponds to the particular day and/or time-of-day at which the media represented by this block of reference signatures was received by the reference signature capturer 508. In some examples, each signature generator 552 is associated with a respective time determiner 554. In some examples, groups of signature generators 552 are associated with a respective time determiner 554. The time determiner (s) 554 can include any timing source, such as a clock, timer, etc., capable of providing time information having an acceptable accuracy.

The illustrated example reference signature capturer 508 of FIG. 5. also includes an example data reporter 556 to report reference data to the matcher/storer(s) 114, 116 and 118. For example, the reference data reported by the example data reporter 556 can include reference signature blocks and associated timestamps and media identifiers generated by the signature generator(s) 552 and the time determiner(s) 554. The data reporter 556 can report the reference data (including the reference signature blocks, the associated timestamps and the media identifiers) as it is collected (e.g., streamed in real time), at specified/predetermined time intervals, when a certain amount of data has been collected, when an available memory space is filled or reaches a threshold capacity (e.g., 90% or some other percentage being full), etc.

Figure 6:
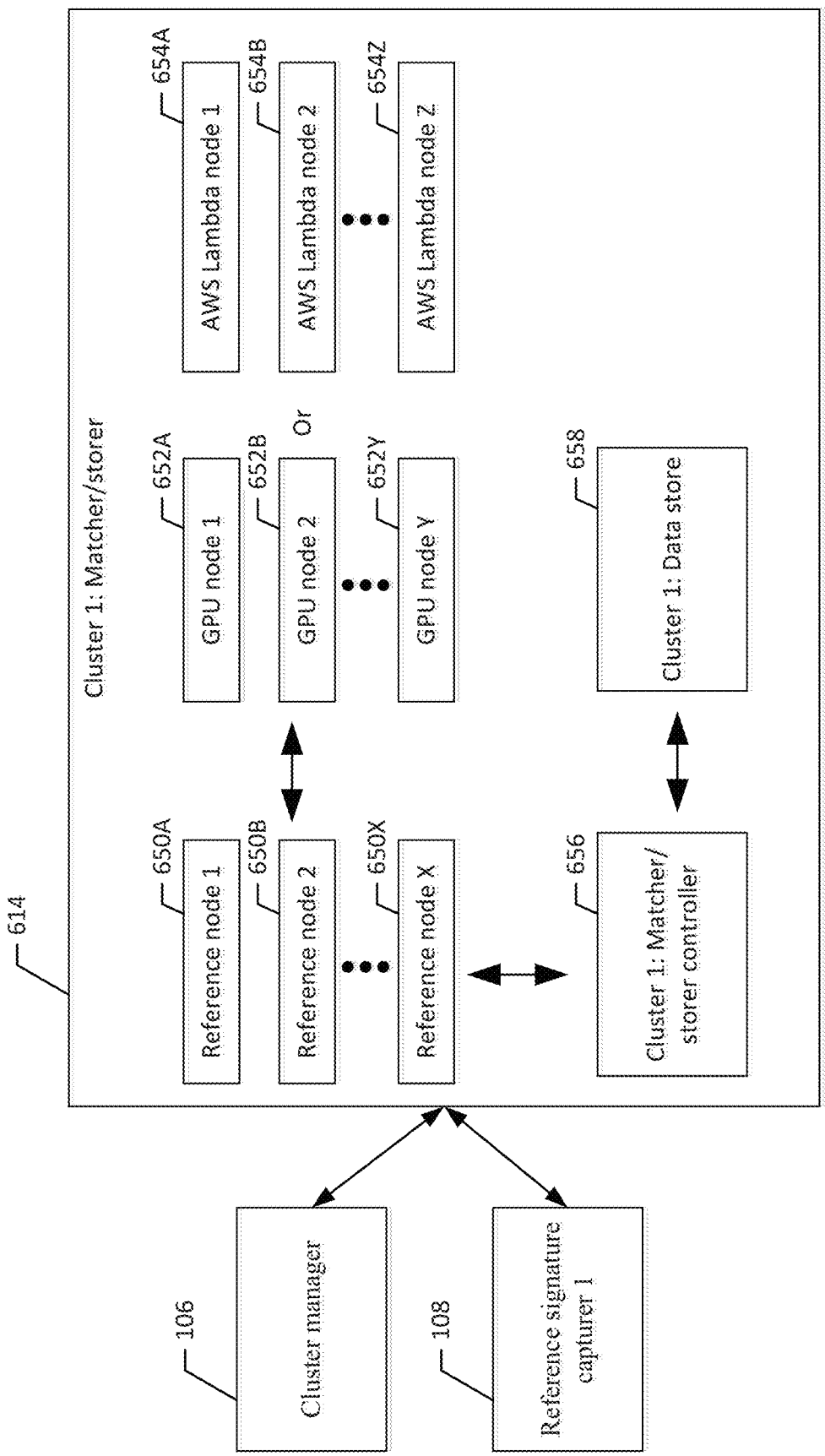
FIG. 6 is a block diagram of an example matcher/storer included in the example system of FIG. 1.

FIG. 6 is a block diagram of an example matcher/storer 614, for example the matcher/storer 114 of FIG. 1. The example matcher/storer 614 includes a plurality of example reference nodes 650A-X, a plurality of example graphic processing units (GPU) 652A-Y and/or a plurality of example server-less compute nodes 654A-Z (for example an Amazon Web Service (AWS) Lambda® node), an example matcher/storer controller 656 and an example data store 658. In the illustrated example, the example matcher/storer 614 (e.g. cluster 1) operates on an in-memory data grid. In some examples, each reference node 650A-650X operates in its own memory partition. The matcher/storer controller 656 maintains a count of the total number of reference nodes in matcher/storer 114 (e.g. cluster 1). In some examples, the matcher/storer controller 656 operates in its own memory partition. In other examples, the matcher/storer controller 656 may operate in the same memory partition as one of the reference nodes, for example reference node 650A.

Figure 7:
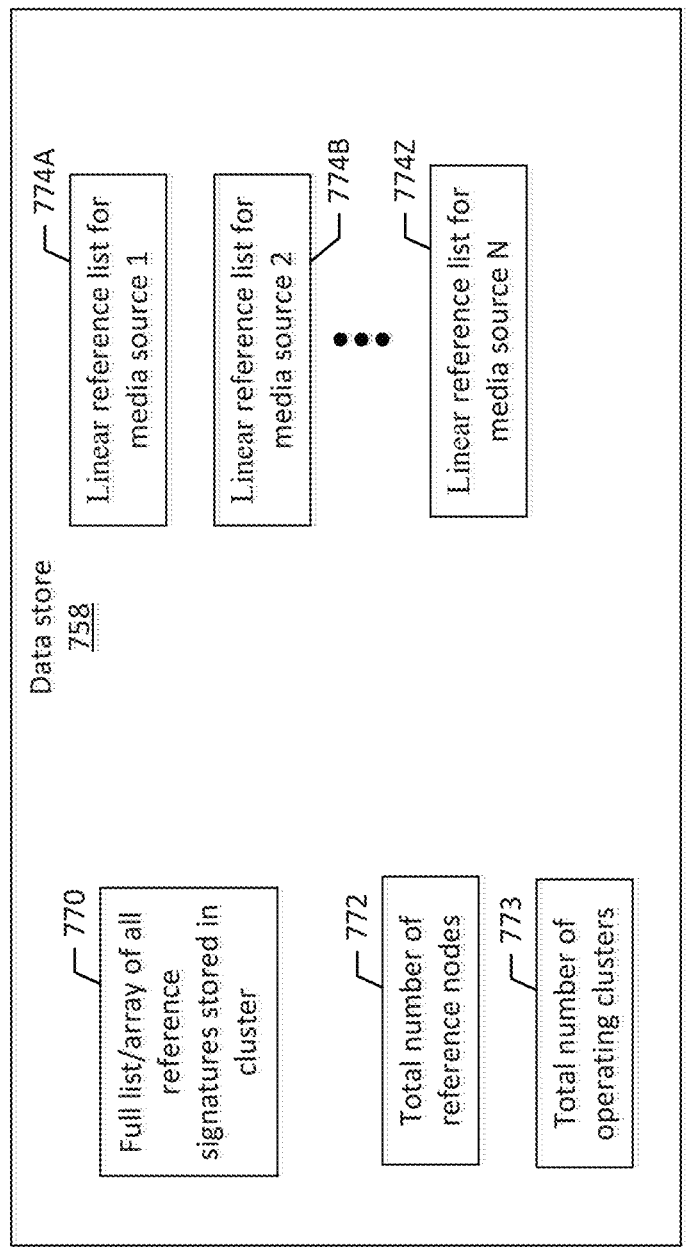
FIG. 7 is a block diagram of an example data store included in the example matcher/storer of FIG. 6.

The matcher/storer controller 656 is communicatively coupled to each reference node 650A-X and the data store 658. FIG. 7 is a block diagram of an example data store 758, for example, the data store 658 of FIG. 6. The matcher/storer controller 656 stores a list/array of all references signatures 770 stored in the matcher/storer 614, a number of reference nodes 772 currently operating in the matcher/storer 614, a linear reference list of each reference signature received from each media source/station 774A-Z and a total number of currently operating clusters 773 (e.g., the total number of currently operating matcher/storers).

The example matcher/storer controller 656 receives queries and/or metering data from the example cluster manager 106. The signatures in the queries and/or metering data are compared to stored reference signatures to determine if a match occurs. In some examples, the matcher/storer controller 656 spawns multiple threads with each tread sending the site signatures to each reference node 650A-X. When a match occurs, the example matcher/storer controller 656 sends responses to the queries back to the cluster manager 106. The responses include reference signature matching information. The reference signature matching information includes the matching reference signature, media identification information that identifies the media corresponding to the matching reference signature and a matching score. The matching score indicates how closely the site signature matched the reference signature. In some examples, the matching score is the Hamming distance between the site signature and the reference signature.

The example matcher/storer controller 656 receives references signatures from the example reference signature capturer 108 and stores the references signatures for comparison to site signatures included in the queries and/or metering data as describe in more detail below. The example matcher/storer controller 656 may receive reference signatures from one or more media sources.

During a matching operation, the example matcher/storer controller 656 receives queries and/or metering data from the example cluster manager 106. The signatures in the queries and/or metering data are compared to stored reference signatures to determine if a match occurs. The query and/or metering data may include one or more site signatures. In some examples, a packet of 128 signatures is received in a query/metering data. The matcher/storer 614 sends each site signature to each of its operating references nodes.

Figure 8:
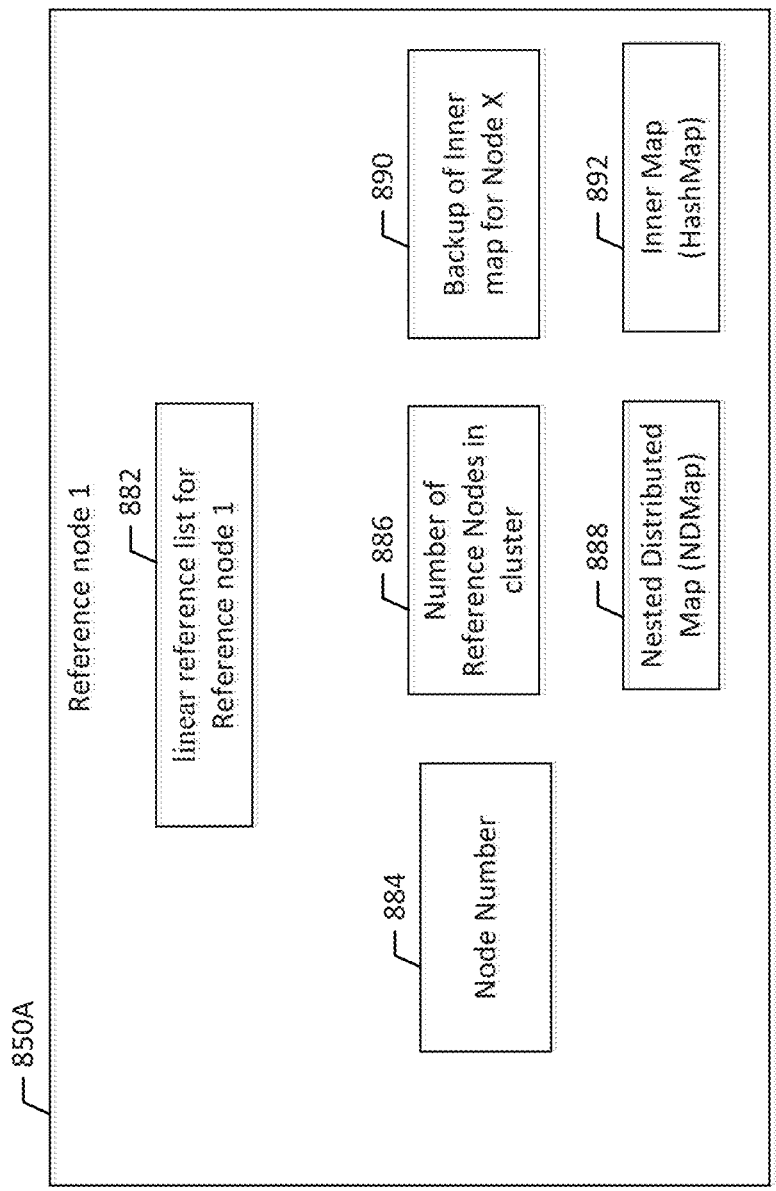
FIG. 8 is a block diagram of an example reference node included in the example matcher/storer of FIG. 6.

FIG. 8 is a block diagram of an example reference node 850A, for example the reference node 650A of FIG. 6. reference node 850A includes a linear list 882 of each reference signature stored in this reference node, the node number 884 of the reference node 850A, the total number of operating reference nodes 886 in this matcher/storer, a nested distributed map (NDMap) 888, an inner map (hashmap) 892, and a backup copy of an inner map for a different reference node 890.

Each reference node 650A-X is assigned a node number, for example, the first reference node 650A is assigned node number 1, the second reference node 650B is assigned node number 2, and so on. Each reference node 650A-X in the matcher/storer 614 checks to determine if it is the owner of the site signature(s) it receives. The reference nodes 650A-X determine if they are the owner of the site signature by calculating a signature node number. A signature node number is calculated as signature node number=(signature) mod (total number of reference nodes), where the signature is the site signature and the total number of reference nodes 886 is the number of reference nodes operating in the respective matcher/storer 114, 116 and 118. The calculated signature node number for the site signature is compared to the node number 884 of the reference node 850A. When they match, the reference node 850A is the owner of the site signature.

In some examples, only when the reference node 850A is the owner of the site signature will the reference node 850A proceed to look for a match for that site signature. This distributes the signature lookup and matching workload among all the reference nodes 650A-X of a cluster and all the memory partitions in a cluster.

When the reference node 850A is the owner of the site signature, the reference node uses an example nested distributed map (NDMap) 888 to locate an inner map (e.g. hashmap 892) for the site signature. The NDMap 888 uses the site signature as the key and the value is the inner map/hashmap 892. The value from the inner map/hashmap 892 contains information about the locations in the linear list or array 882 where hash values of the reference signatures correspond to the hash value of the site signature appear, and the timestamp associated with them. In the illustrated example, inner map (hashmap) 892 has the following <Key, Value> structure: <TS_PktIndex_SIDIndex, sigLoc>, where TS is a 32 bit timestamp, PktIndex is an 8 bit index of the signature within a packet (0-127), SIDIndex is an 8 bit index assigned to a particular media source, and sigLoc is the locations of hash values of the reference signatures corresponding to the hash value of the site signature in the respective linear reference list or array 882. In some examples, the TS,PktIndex and SIDIndex are bit shifted to the left, to their respective positions for a total size of 48 bits, which is stored as a Long data structure (64 bit format).

When the reference node 850A is the owner of the site signature, a Hamming distance between the neighborhood of the hash value of the site signature and the respective neighborhoods of each of the hash values of the references signatures are calculated to find the best match between the site signature and the reference signatures. In some examples, a neighborhood includes 16 signatures (or any other number of signatures) on either side of the site signature or reference signature.

The Hamming distance calculation can be a computationally intensive operation. In some examples, the Hamming distance calculation is offloaded from the reference node 850A to nodes in the cluster that contain graphic processing units (GPUs), for example GPU nodes 652A-Y and/or to server-less compute nodes (e.g. dynamic cloud computing capacity), for example Amazon Web Service (AWS) Lambda® nodes 654A-Z (see FIG. 6). In other examples, the Hamming distance calculation is done in the reference node 850A.

When the Hamming distance calculation is offloaded, the site signature and the inner map/hashmap 892 of all the potential match locations are sent to the GPU nodes 652A-Y and/or to the AWS Lambda® nodes 654A-Z. Since a GPU node typically has a large number of cores at its disposal (typically 1536 or 2048), the GPU node can parallelize the operation of computing the Hamming distance for finding the best match. In addition, potential match locations from multiple key lookups or from multiple site signatures may be batched and sent to the GPU nodes. When a match is found, the GPU node or the AWS Lambda node returns the media identification information of the reference signature to the reference node. In some examples, a matching score, for example the Hamming distance, for the best match is also returned to the reference node.

When more than one matcher/storer 114, 116 and 118 is operating, a reference node 650A-X in each matcher/storer 114, 116 and 118 will have the signature node number match its node number. As such, each matcher/storers 114, 116 and 118 will have one reference node that determines that it is the owner of the site signature. However, only one of the reference nodes in one of the matcher/storers 114, 116 and 118 will actually be the owner of the site signature. The reference node 650A-X that is the true owner of the site signature will have a better matching score (e.g. a much smaller Hamming distance) than the other reference nodes in the other matcher/storers 114, 116 and 118. The match receiver 442 in the cluster manager 406 will receive the reference signature matching information, including the matching score, from each operating matcher/storer 114, 116 and 118. The match receiver 442 will determine which matcher/storer 114, 116 and 118 has the reference signature matching information that has the best matching score. The match receiver 442 will select that reference signature matching information as the correct match to the query.

Returning to FIG. 6, during reference signature loading, the matcher/storer controller 656 receives reference signatures from a reference signature capturer, for example the reference signature capturer 108 of FIG. 1. The references signatures may be from one or more media sources, for example media sources 104A (e.g. media sources 0-100) shown in FIG. 1. When a reference signature is received, the matcher/storer controller 656 determines which reference node 650A-X will store that reference signature.

The reference signatures are distributed equally among the reference nodes 650A-X by calculating a reference node number. The reference node number is calculated by taking the MOD of the reference signature using the total number of reference nodes in the matcher/storer 614, for example reference node number=(reference signature) MOD (Total Number of reference nodes operating in the matcher/storer). Each reference node 650A-X is assigned a node number, for example, the first reference node 650A is assigned node number 1, the second reference node 650B is assigned node number 2, and so on. The reference node 650A-X whose node number matches the calculated reference node number is selected to store the received reference signature. In some examples, the total number of reference nodes in the cluster is equal to the total number of memory partitions in the cluster.

Once a reference node has been selected to store the reference signature, the matcher/storer controller 656 passes the reference signature to the reference node 650A-X. The matcher/storer controller 656 updates the list/array of all references signatures 770 stored in the cluster (e.g. all references signatures 770 the matcher/storer 114 has saved) and the corresponding linear reference list for the media source associated with the receive reference signature. For example, when the reference signature is from media source 1, the linear reference list 774A would be updated.

When reference node 850A receives a reference signature from the matcher/storer controller 656, the reference node 850A stores the hash value of the reference signature in a distributed list, for example the linear reference list 882. The linear reference list 882 contains a sequential list of the hash values of the reference signatures stored in this reference node. The reference node also updates its inner map (hashmap) 892 which includes a 24-bit hash pointer/indexes to locations of matching entries in the linear reference list 882. In some examples, the inner map 892 is updated by taking a hash of the references signature and determining each location in the linear reference list 882 that match the hash of the reference signature. The reference node updates the NDMap 888 with the updated inner map information and sends the updated inner map information back to the matcher/storer controller 656 so that the other copies of the NDMap 888 can be updated.

In the illustrated example, the reference node 850A would also update the backup copy of its inner map stored in one of the other reference nodes. In some examples, the backup copy of the inner map for a given reference node is stored in the next reference node, wrapping around to the first reference node for the last reference node in the list. For example, the backup copy for reference node 1 would be stored in reference node 2, and the backup copy of reference node N would be stored in reference node 1. In some examples, the matcher/storer controller 656 updates the backup copy of the inner map for the selected reference node 850A-X.

Each matcher/storer 114,116 and 118 would continually update/add reference signatures for a predetermined number of media sources. In some examples, each of the linear lists or arrays 774A-Z for each media source has a maximum number of reference signatures. When the maximum number of reference signatures has been reached, the linear list or array 774A-Z would automatically rewrite new signature identities starting from the beginning of the linear list or array. The over-written entry corresponding to the over-written signature is deleted from the inner map/hashmap 892. Initially, the linear lists or arrays 774A-Z are pre-allocated to the predetermined maximum length and filled with zeros to avoid out-of-range exceptions.

In some examples, reference signatures are flushed from the linear lists or arrays 774A-Z when the timestamp from the reference signature is older that a threshold time compared to the current time. When a reference signature is flushed from the linear lists or arrays 774A-Z in this manner, the reference signature is overwritten with zeros.

In some examples, each linear reference list 882 for each reference node 650A-X is forced to be created in a partition that belongs to that reference node (e.g. the reference machine where the references signatures from that media source are stored). Therefore, during the match operation, each reference node 650A-X does the Hamming distance computation for the best match only within its own linear reference list 882, which helps to parallelize the matching operations. As such, the time it takes for a matching operation may increase slowly as the system 100 scales upward to handle more media sources and/or more queries.

While an example manner of implementing the scalable signature matching and updating system 100 of FIG. 1 is illustrated in FIGS. 2-8, one or more of the elements, processes and/or devices illustrated in FIGS. 2-8 may be combined, divided, re-arranged, omitted, eliminated and/or implemented in any other way. Further, the example cluster manager 106, the example reference signature capturer(s) 108, 110 and 112, the example matcher/storer(s) 114, 116 and 118, the example query queue manager 440, the example match receiver 442, the example capacity manager 444, the example media creditor 446, the example media receiver 550, the example signature generator 552, the example time determiner 554, the example data reporter 556, the example matcher/storer Controller 656 and/or, more generally, the example scalable signature matching and updating system 100 of FIG. 3 may be implemented by hardware, software, firmware and/or any combination of hardware, software and/or firmware. Thus, for example, any of the example cluster manager 106, the example reference signature capturer(s) 108, 110 and 112, the example matcher/storer(s) 114, 116 and 118, the example query queue manager 440, the example match receiver 442, the example capacity manager 444, the example media creditor 446, the example media receiver 550, the example signature generator 552, the example time determiner 554, the example data reporter 556, the example matcher/storer Controller 656 and/or, more generally, the example scalable signature matching and updating system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100, the example, cluster manager 106, the example reference signature capturer(s) 108, 110 and 112 and/or the example matcher/storer(s) 114, 116 and 118, the example query queue manager 440, the example match receiver 442, the example capacity manager 444, the example media creditor 446, the example media receiver 550, the example signature generator 552, the example time determiner 554, the example data deporter 556, and/or the example matcher/storer Controller 656 is/are hereby expressly defined to include a tangible computer readable storage device or storage disk such as a memory, a digital versatile disk (DVD), a compact disk (CD), a Blu-ray disk, etc. storing the software and/or firmware. Further still, the example architecture for scalable signature matching and updating system 100 of FIG. 1 may include one or more elements, processes and/or devices in addition to, or instead of, those illustrated in FIGS. 2-8, and/or may include more than one of any or all of the illustrated elements, processes and devices.

Figure 9:
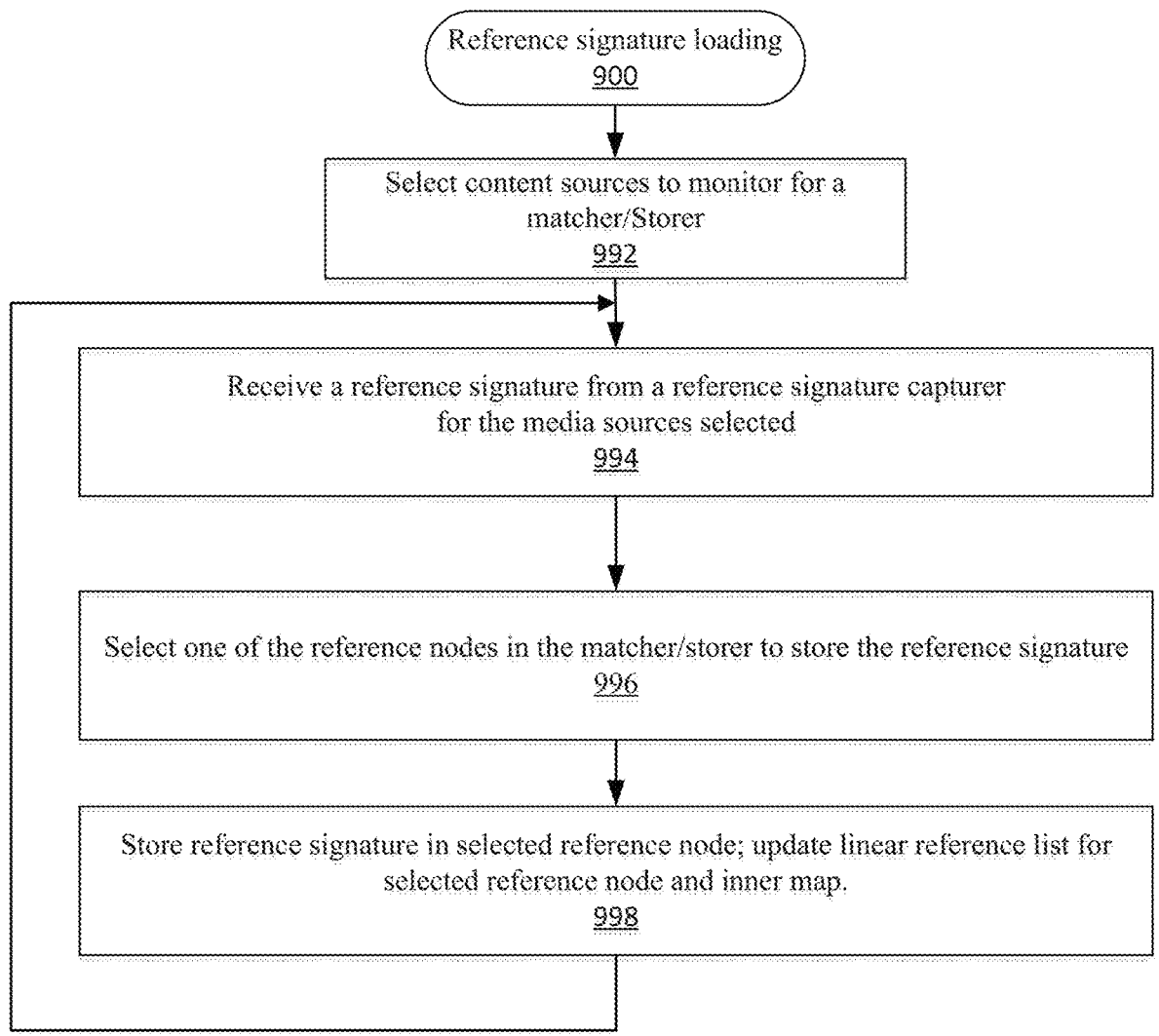
FIG. 9 is a flowchart representative of example machine readable instructions for implementing reference signature loading in the matcher/storer(s) of FIGS. 1 and 6.
Figure 10:
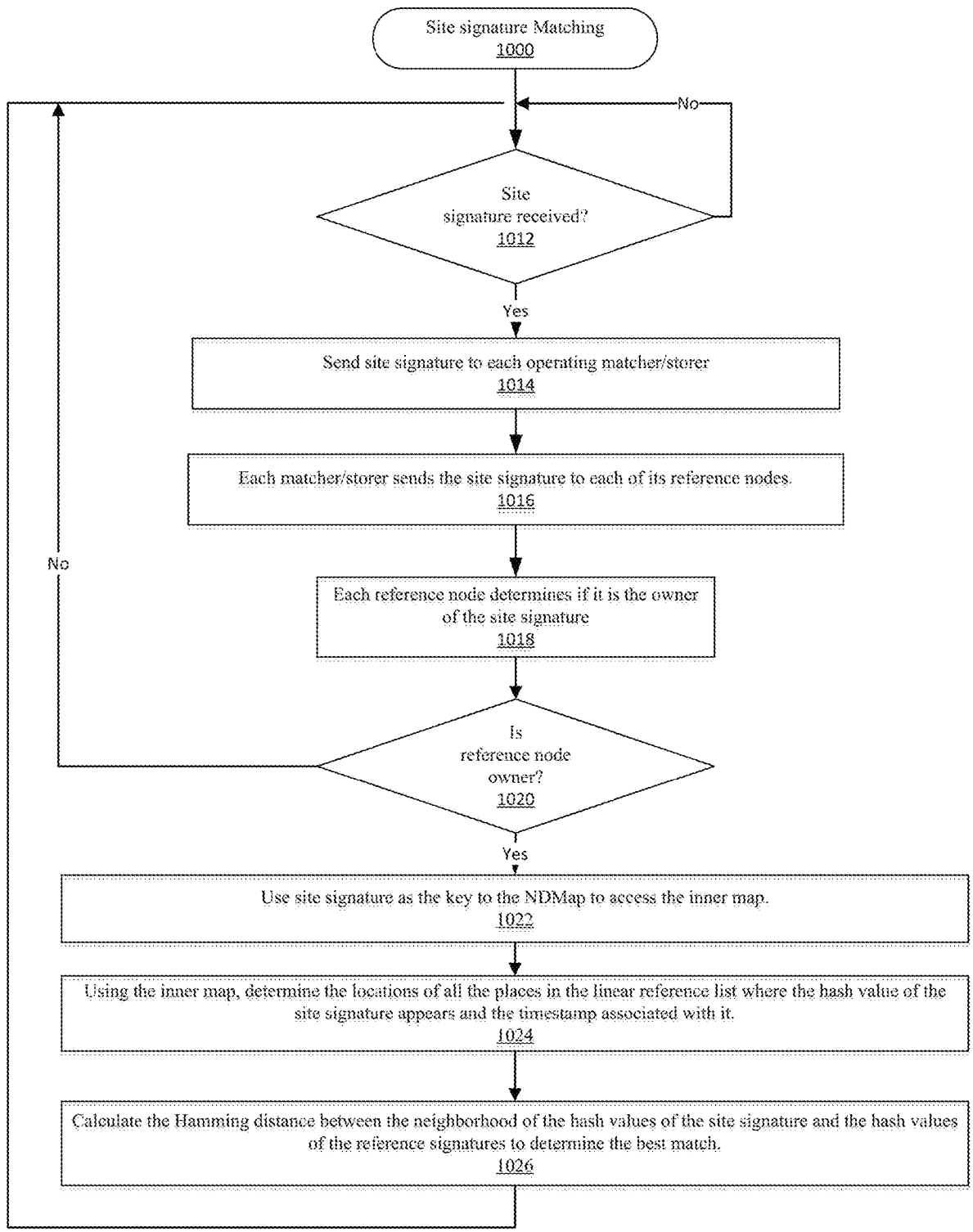
FIG. 10 is a flowchart representative of example machine readable instructions for implementing site signature matching in the matcher/storer(s) of FIGS. 1 and 6.
Figure 11:
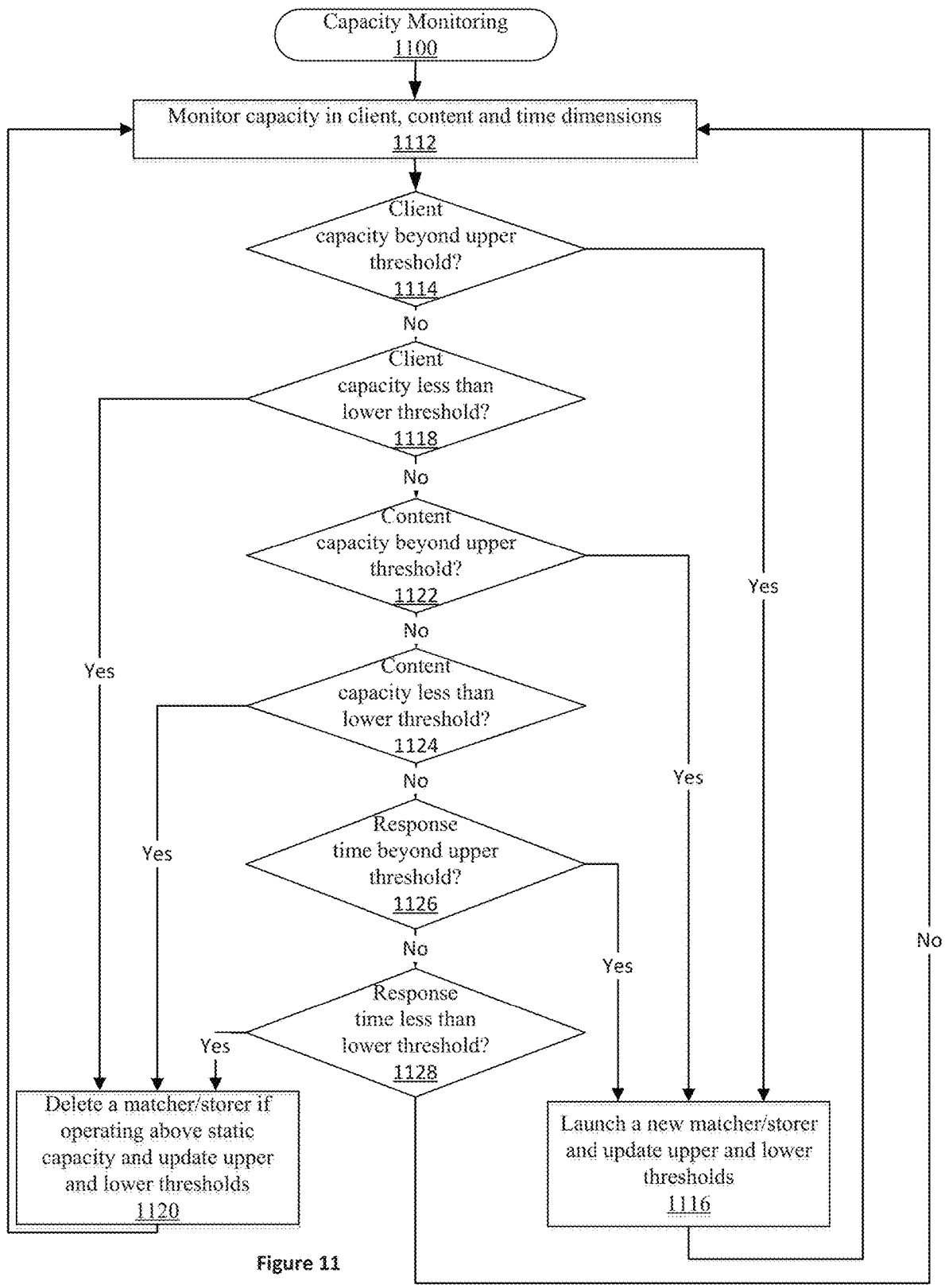
FIG. 11 is a flowchart representative of example machine readable instructions for implementing the example capacity manager in the cluster manager of FIGS. 1 and 4.

Flowchart representative of example machine readable instructions for implementing the scalable signature matching and updating system 100 of FIG. 1 is shown in FIGS. 9-11. In this example, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 9-11, many other methods of implementing the example scalable signature matching and updating system 100 of FIG. 1 may alternatively be used. For example, the order of execution of the blocks may be changed, and/or some of the blocks described may be changed, eliminated, or combined.

As mentioned above, the example processes of FIGS. 9-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

An example program 900 that may be executed to implement reference signature loading in the example matcher/storer(s) of FIGS. 1 and 6 is represented by the flowchart shown in FIG. 9. For clarity, and with no loss of generality, the description of example program 900 will make references to just one of the matcher/storer(s) of FIGS. 1 and 6 (e.g., matcher/storer 614 being used to implement matcher/storers 114, 116 and 118) and just one of the reference signature capture(s) of FIGS. 1, 3 and 5 (e.g. reference signature capturer 508 being used to implement reference signature caprturer(s) 108, 110 and 112). With reference to the preceding figures and associated written descriptions, the example program 900 of FIG. 9 begins execution at block 992 where the media sources to be monitored by the matcher/storer 614 are selected. Flow continues in block 994.

The matcher/storer 614 receive reference data from the reference signature capturer 508 for the media sources selected as described above, which includes the reference signature, the associated timestamps and the media identification information. Flow continues in block 996.

The matcher/storer controller 656 determines which reference node will store the reference signature that was received from the reference signature capturer 508 (block 996). The reference signatures are distributed equally among the reference nodes 650A-X by calculating a reference node number. The reference node number is calculated by taking the modulo of the reference signature using the total number of reference nodes in the matcher/storer 614, for example referenece node number=(Reference signature) MOD (Total Number of reference nodes in the matcher/storer), where MOD is the modulo operator. Each reference node 650A-X is assigned a node number, for example, the first reference node 650A is assigned node number 1, the second reference node 650B is assigned node number 2, and so on. The reference node 650A-X whose node number matches the calculated reference node number is selected to store the received reference signature.

Once a reference node has been selected to store the reference signature, the matcher/storer controller 656 passes the reference data to that reference node. The matcher/storer controller 656 updates the list/array of references signatures 770 stored in the cluster (e.g. identity of the references signatures 770 the matcher/storer 114 has saved) and the corresponding linear reference list 774A-Z for the media source associated with the receive reference data. For example, when the reference signature is from media source 1, the linear reference list 774A would be updated. Flow continues in block 998.

The selected Refence Node 650A-X stores the hash value for the reference signature into its linear reference list 882 and updates its inner map 890 and its backup copy of its inner map (block 998). Flow returns to block 994.

An example program 1000 that may be executed to implement site signature matching in the example matcher/storer(s) of FIGS. 1 and 6 is represented by the flowchart shown in FIG. 10. For clarity, and with no loss of generality, the description of example program 1000 will make references to just one of the matcher/storer(s) of FIGS. 1 and 6 (e.g., matcher/storer 614 being used to implement matcher/storers 114, 116 and 118), just one of the reference signature capture(s) of FIGS. 1, 3 and 5 (e.g. reference signature capturer 508 being used to implement reference signature caprturer(s) 108, 110 and 112) and just one cluster manager of FIGS. 1 and 4 (e.g. cluster manager 406 being used to implement the cluster manager 106). With reference to the preceding figures and associated written descriptions, the example program 1000 of FIG. 10 begins execution at block 1012 where a check is made to determine if a new query/site signature, or block of site signatures, has been received by the query queue manager 440 in the cluster manager 406. When no new query/site signature, or block of site signatures, has been received, flow loops back to block 1012. When a new query/site signature, or block of site signatures, has been received, flow continues at block 1014.

When a new query/site signature, or block of site signatures, has been received, the query queue manager 440 in the cluster manager 406 sends the site signature, or block of site signatures, to each operating matcher/storer 614 (block 1014). In some examples, the query queue manager 440 spawns multiple threads with each thread sending a an instance of a same query to each matcher/storer (e.g. each cluster). In this way, each matcher/storer can be processing the same query in parallel. Each operating matcher/storer 614 sends each site signature to each of its reference node 650A-X (block 1016). Each reference node 650A-X in each operating matcher/storer 614 checks to determine if it is the owner of each of the site signatures (block 1020).

In some examples, the reference nodes 650A-X determine if they are the owner of the site signature by calculating a signature node number and comparing it to their node number as describe in detail above. If a reference node 650A-X is not the owner of the site signature, flow returns to block 1012. When a reference node 650A-X determines that it is the owner of a site signature, flow continues in block 1022.

When a reference node 650A-X determines that it is the owner of a site signature, the reference node 650A-X accesses the NDMap 888 using the site signature as the key and the value is the inner map/hashmap 892 (block 1022). Flow continues at block 1024.

Using the inner map 892, the reference node 650A-X accesses the information about all the locations in the linear reference list 882 where hash values of the reference signatures that correspond to the hash value of the site signature appear and the timestamp associated with them (block 1024). The reference node 650A-X determines the best match (e.g., for example, the smallest Hamming distance) between the neighborhood of the hash values of the site signature and the hash values of the references signatures in the linear references list 882 (block 1026). In some examples, a Hamming distance is used to determine the best match. In some examples, the reference nodes 650A-X calculate the Hamming distances. In other examples, the Hamming distance calculations are offloaded to a corresponding GPU node 652A-Y and/or a AWS Lambda nodes 654A-Z. Once the best match has been determined, the reference node 650A-X passes the media information, including the matching score, associated with the best matching reference signature back to the matcher/storer 614. Flow then returns to block 1012.

An example program 1100 that may be executed to implement the example capacity manager 444 in the cluster manager 406 of FIGS. 1 and 4 to manage capacity is represented by the flowchart shown in FIG. 11. For clarity, and with no loss of generality, the description of example program 1100 will make references to just one of the matcher/storer(s) of FIGS. 1 and 6 (e.g., matcher/storer 614 being used to implement matcher/storers 114, 116 and 118), just one of the reference signature capture(s) of FIGS. 1, 3 and 5 (e.g. reference signature capturer 508 being used to implement reference signature caprturer(s) 108, 110 and 112) and just one of the cluster managers of FIGS. 1 and 4 (e.g. cluster manager 406 being used to implement the cluster manager 106). With reference to the preceding figures and associated written descriptions, the example program 1100 of FIG. 11 begins execution at block 1112 where the capacity manager 444 monitors the capacity of the example system 100 in the client, content and time dimensions.

In some examples, the capacity manager 444 monitors the client dimension by tracking and/or monitoring the number of device meters 102A-C that have a query pending, and/or tracking and/or monitoring the number of queries received over a given period of time. In some examples the capacity manager 444 may use a running average of the number of queries received over a given period of time. In some examples, the capacity manager 444 monitors the content dimension by tracking and/or monitoring the number of media sources 104A-C for which the reference signature capturer 508 are generating reference signatures. In some examples, the capacity manager 444 monitors the time dimension by tracking and/or monitoring the response time for a query and/or the media availability time. Flow continues in block 1114.

The number of device meters 102A-C that have a query pending and/or the number of queries received over a given period of time are compared to the current upper client dimension threshold (block 1114). When the number of device meters 102A-C that have a query pending or the number of queries received over a given period of time satisfies (e.g., is greater than) the upper client dimension threshold, flow continues at block 1116. Otherwise, flow continues at block 1118.

When the number of device meters 102A-C that have a query pending or the number of queries received over a given period of time satisfies the current upper client dimension threshold, an additional matcher/storer is initiated/launched by the capacity manager 444 (block 1116). In addition, the current upper and lower client dimension thresholds are reset to the next higher level of thresholds. Adding an additional matcher/storer helps the system scale to support an increase in the number of device meters 102A-C while maintaining the same matching response time. This allows the system to scale linearly in the client dimension. In some examples, when the number of device meters 102A-C that have a query pending or the number of queries received over a given period of time satisfies the current upper client dimension threshold, in addition to, or instead of, launching an additional matcher/storer, an additional reference node may be added to a matcher/storer. Adding a reference node to a matcher/storer will help to maintain the system response time by parallelizing the tasks needed to perform a match for a device meter/client. Flow then returns to block 112.

When the number of device meters 102A-C that have a query pending or the number of queries received over a given period of time does not satisfy the current upper client dimension threshold, the number of device meters 102A-C that have a query pending and/or the number of queries received over a given period of time are compared to the current lower client dimension threshold (block 1118). When the number of device meters 102A-C that have a query pending or the number of queries received over a given period of time satisfies (e.g., is less than) the lower client dimension threshold, flow continues at block 1120. Otherwise, flow continues at block 1122.

When only one matcher/storer 114 is in operation (e.g. the system 100 is operating at its static capacity), the number of device meters 102A-C that have a query pending or the number of queries received over a given period of time cannot satisfy the lower client dimension threshold (e.g. can't get below zero). As such flow continues at block 1122.

When the number of device meters 102A-C that have a query pending or the number of queries received over a given period of time satisfies the lower client dimension threshold, a matcher/storer 614 is inactivated or deleted (block 1120) and the current upper and lower client dimension thresholds are reset to the next lower level of thresholds. In some examples, when the number of device meters 102A-C that have a query pending or the number of queries received over a given period of time satisfies the lower client dimension threshold, in addition to, or instead of, inactivating a matcher/storer, a reference node may be inactivated from a matcher/storer. Flow then returns to block 1112.

The number of media sources 104A-C for which the reference signature capturer 508 are generating reference signatures for are compared to the current upper content dimension threshold (block 1122). When the number of media sources 104A-C for which the reference signature capturer 508 are generating reference signatures satisfies (e.g., is greater than) the upper content dimension threshold, flow continues at block 1116. Otherwise, flow continues at block 1124.

When the number of media sources for which the reference signature capturer 508 are generating reference signatures satisfies the current upper content dimension threshold, an additional matcher/storer 614 is initiated/launched by the capacity manager 444 (block 1116). In addition, the current upper and lower content dimension thresholds are reset to the next higher level of thresholds. The new media sources 104A-C are assigned to the new matcher/storer 614. Flow continues at block 1112.

When the number of media sources 104A-C for which the reference signature capturer 508 are generating reference signatures does not satisfy the current upper content dimension threshold, the number of media sources 104A-C for which the reference signature capturer 508 are generating reference signatures is compared to the current lower content dimension threshold (block 1124). When the number of media sources 104A-C that the reference signature capturer 508 are generating reference signatures satisfies (e.g., is less than) the lower client dimension threshold, flow continues at block 1120. Otherwise, flow continues at block 1126.

When only one matcher/storer 114 is in operation (e.g. the system 100 is operating at its static capacity), the number of media sources 104A-C for which the reference signature capturer 508 are generating reference signatures cannot satisfy the lower content dimension threshold (e.g. can't get below zero). As such, flow continues at block 1126.

When the number of media sources for which the reference signature capturer 508 are generating reference signatures satisfies the lower content dimension threshold, a matcher/storer 614 is inactivated or deleted (block 1120) and the current upper and lower content dimension thresholds are reset to the next lower level of thresholds. Flow then returns to block 1112.

The response time for a query and/or the media availability time are compared to the current respective upper time dimension thresholds (block 1126). When the response time for a query or the media availability time satisfies (e.g., is greater than) the respective upper time dimension threshold, flow continues at block 1116. Otherwise, flow continues at block 1128.

When the response time for a query or the media availability time satisfies the current respective upper time dimension threshold, an additional matcher/storer 516 is initiated/launched by the capacity manager 444 (block 1116). In addition, the current upper and lower time dimension thresholds are reset to the next higher level of thresholds. In some examples, the system may be throttling due to bad threads/node failures/un-expected burst in client volume, etc., which may result in longer pending job queues. This may cause client request and/or query signatures to wait longer in the queue to be processed by the Query queue manager 440. Adding a new matcher/storer can effectively reduce the length of the pending queue, which results in a reduction in the perceived matching time as seen by a device meter 102A-C. In some examples, when the response time for a query or the media availability time satisfies the current respective upper time dimension threshold, in addition to, or instead of, launching an additional matcher/storer, an additional reference node may be added to a matcher/storer. Flow then returns to block 1112.

When the response time for a query or the media availability time does not satisfy the current respective upper time dimension thresholds, the response time for a query and/or the media availability time are compared to the current respective lower time dimension thresholds (block 1124). When the response time for a query or the media availability time satisfies (e.g., is less than) the lower time dimension threshold, flow continues at block 1120. Otherwise, flow returns to block 1112.

When only one matcher/storer 614 is in operation (e.g. the system 100 is operating at its static capacity), the response time for a query or the media availability time cannot satisfy the lower time dimension threshold (e.g. can't get below zero). As such, flow continues at block 1112.

When the response time for a query or the media availability time satisfies the lower content dimension threshold, a matcher/storer 614 is inactivated or deleted (block 1120) and the current upper and lower content dimension thresholds are reset to the next lower level of thresholds. In some examples, when the response time for a query or the media availability time satisfies the lower content dimension threshold, in addition to, or instead of, inactivating a matcher/storer, a reference node may be inactivated from a matcher/storer. Flow then returns to block 1112

Figure 12:
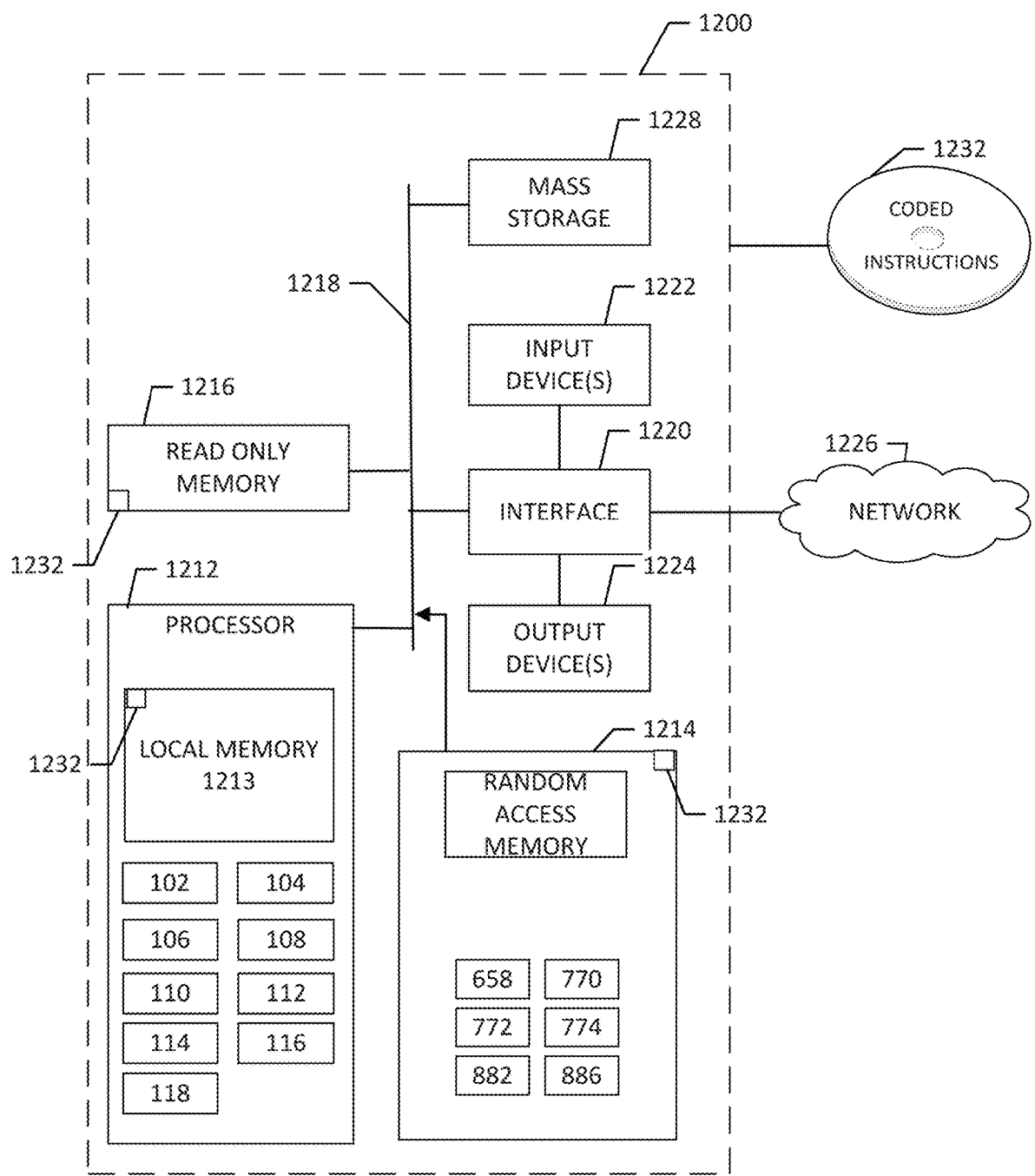
FIG. 12 is a block diagram of an example processor platform 1200 structured to execute the instructions of FIGS. 9, 10 and/or 11 to implement system 100 of FIG. 1-8

FIG. 12 is a block diagram of an example processor platform 1200 structured to execute the instructions of FIGS. 9, 10 and 11 to implement the example scalable signature matching and updating system 100 of FIG. 1-8. The processor platform 1200 can be, for example, a server, a personal computer, a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 9-11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed example methods, apparatus and articles of manufacture improve the performance of a signature matching and updating system by scaling the system 100 in response to changes in client, content and time dimensions.

Disclosed examples allow the signature matching and updating system to maintain or reduce a query response time even when the signature matching and updating system is undergoing increased demand from an increasing number of device meters sending queries to the signature matching and updating system. Disclosed examples also allow the signature matching and updating system to reduce the processing power and energy used when the number of device meters sending queries to the signature matching and updating system is reduced during periods of low activity.

Disclosed examples also allow the signature matching and updating system to increase the number of different pieces of media that can be identified in the database while maintaining the query response time and/or the media availability time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a first compute node associated with a first subset of reference signatures, the first compute node to:
      determine a signature node number for a first site signature of a plurality of site signatures representative of monitored media;
      determine that a reference signature corresponding to the first site signature is stored at the first compute node based on a comparison of the signature node number with a first node number of the first compute node; and
      in response to the determination that the reference signature is stored at the first compute node, compare a neighborhood of site signatures including the first site signature to reference signatures in the first subset of reference signatures to identify the monitored media, and determine matching information, the matching information including media identification information that identifies reference media corresponding to a matching reference signature; and
   a first memory partition of a computer system associated with the first compute node, the first memory partition to store the first subset of reference signatures.

2. The apparatus as defined in claim 1, wherein the reference signature is a first reference signature, and further including:
   a second compute node associated with a second subset of reference signatures different than the first subset of reference signatures, the second compute node to:
      determine that a second reference signature corresponding to the first site signature is stored in the second compute node; and
      in response to the determination that the second reference signature is stored at the second compute node, compare the neighborhood of site signatures including the first site signature to reference signatures in the second subset of reference signatures; and
   a second memory partition of the computer system, different than the first memory partition, the second memory partition to store the second subset of reference signatures.

3. The apparatus as defined in claim 2, wherein the first compute node and the second compute node operate in parallel to determine the first reference signature is stored at the first compute node and the second reference signature is stored at the second compute node.

4. The apparatus as defined in claim 1, wherein the first compute node further includes:
   a linear list of the first subset of reference signatures; and
   a nested distributed map (NDMap), the first compute node to query the NDMap using the first site signature as a key to retrieve an inner map, the inner map including locations of reference signatures corresponding to the first site signature in the linear list, the first compute node to compare the first site signature to the reference signatures corresponding to the first site signature in the linear list.

5. The apparatus as defined in claim 4, further including a first graphic processing unit (GPU), the first compute node to send the first site signature and the inner map to the GPU, the GPU to compare the first site signature to the reference signatures corresponding to the first site signature in the linear list.

6. The apparatus as defined in claim 4, wherein the NDMap is a reverse index map.

7. The apparatus as defined in claim 1, wherein the matching information further includes a matching score.

8. The apparatus as defined in claim 1, wherein the first compute node is to determine the signature node number for the first site signature based on (1) a number associated with the first site signature and (2) a total number of compute nodes.

9. The apparatus as defined in claim 1, wherein the first compute node is to perform a first modulo operation based on the first site signature and a total number of compute nodes to determine the signature node number.

10. A tangible machine readable storage medium comprising machine readable instructions which, when executed, cause a first compute node to at least:
    determine a signature node number for a first site signature of a plurality of site signatures representative of monitored media;
    determine that a reference signature corresponding to the first site signature is stored at the first compute node based on a comparison of the signature node number with a first node number of a first compute node; and
    in response to the determination that the reference signature is stored at the first compute node, compare a neighborhood of site signatures including the first site signature to reference signatures in a first subset of reference signatures to identify the monitored media, and determine matching information, the matching information including media identification information that identifies reference media corresponding to a matching reference signature, the first subset of reference signatures stored in a first memory partition of a computer system associated with the first compute node.

11. The tangible machine readable storage medium as defined in claim 10, wherein the reference signature is a first reference signature, and the machine readable instructions, when executed, further to cause the machine to:
   determine that a second reference signature corresponding to the first site signature is stored in a second compute node; and
   in response to the determination that the second reference signature is stored at the second compute node, compare the neighborhood of site signatures including the first site signature to reference signatures in a second subset of reference signatures different than the first subset of reference signatures, the second subset of reference signatures stored in a second memory partition of the computer system, different than the first memory partition.

12. The tangible machine readable storage medium as defined in claim 10, wherein the machine readable instructions, when executed, further cause the machine to:
   query a nested distributed map (NDMap) to compare the first site signature to the reference signatures in the first subset of reference signatures, the query to use the first site signature as a key to retrieve an inner map, the inner map including locations of reference signatures corresponding to the first site signature in a linear list of the first subset of reference signatures; and
   compare the first site signature to the reference signatures corresponding to the first site signature in the linear list.

13. The tangible machine readable storage medium as defined in claim 10, wherein the machine readable instructions, when executed, cause the machine to at least determine the signature node number for the first site signature based on (1) a number associated with the first site signature and (2) a total number of compute nodes.

14. A method, comprising:
   determining, by executing an instruction with a processor, a signature node number for a first site signature of a plurality of site signatures representative of monitored media;
   determining, by executing an instruction with the processor, that a reference signature corresponding to the first site signature is stored at a first compute node based on a comparison of the signature node number with a first node number of the first compute node; and
   in response to the determination that the reference signature is stored at the first compute node, comparing, by executing an instruction with the processor, a neighborhood of site signatures including the first site signature to reference signatures in a first subset of reference signatures to identify the monitored media, and determining matching information, the matching information including media identification information that identifies reference media corresponding to a matching reference signature, the first subset of reference signatures stored in a first memory partition of a computer system associated with the first compute node.

15. The method as defined in claim 14, wherein the reference signature is a first reference signature, and further including:
   determining that a second reference signature corresponding to the first site signature is stored in a second compute node; and
   in response to the determination that the second reference signature is stored in the second compute node, comparing the neighborhood of site signatures including the first site signature to reference signatures in a second subset of reference signatures different than the first subset of reference signatures, the second subset of reference signatures stored in a second memory partition of the computer system, different than the first memory partition.

16. The method as defined in claim 14, further including:
   querying a nested distributed map (NDMap) to compare the first site signature to reference signatures in the first subset of reference signatures, the querying of the NDMap using the first site signature as a key to retrieve an inner map, the inner map including locations of references signatures corresponding to the first site signature in a linear list of the first subset of reference signatures; and
   comparing the first site signature to the reference signatures corresponding to the first site signature in the linear list.

17. The method as defined in claim 16, further including:
   sending the first site signature and the inner map to a first graphic processing unit (GPU), the first GPU to compare the first site signature to the reference signatures corresponding to the first site signature in the linear list.

18. The method as defined in claim 16, wherein the NDMap is a reverse index map.

19. The method as defined in claim 14, wherein the matching information further includes a matching score.

20. The method as defined in claim 14, further including determining the signature node number for the first site signature based on (1) a number associated with the first site signature and (2) a total number of compute nodes.

* * * * *